(12) United States Patent
Rentel et al.

(10) Patent No.: US 12,385,884 B2
(45) Date of Patent: Aug. 12, 2025

(54) SYSTEM, APPARATUS, AND METHOD FOR ULTRASONIC SIGNAL TRANSMISSION AND RECEPTION USING A MIXED DIGITAL AND ANALOG BUS NETWORK

(71) Applicant: X-Wave Innovations, Inc., Gaithersburg, MD (US)

(72) Inventors: Carlos Rentel, Gaithersburg, MD (US); Dan Xiang, Gaithersburg, MD (US)

(73) Assignee: X-wave Innovations, Inc., Gaithersburg, MD (US)

( * ) Notice: Subject to any disclaimer, the term of this patent is extended or adjusted under 35 U.S.C. 154(b) by 492 days.

(21) Appl. No.: 17/965,670

(22) Filed: Oct. 13, 2022

(65) Prior Publication Data

US 2023/0126816 A1 Apr. 27, 2023

Related U.S. Application Data

(60) Provisional application No. 63/270,623, filed on Oct. 22, 2021.

(51) Int. Cl.
*G01N 29/44* (2006.01)
*G01N 29/07* (2006.01)
*G01N 29/24* (2006.01)

(52) U.S. Cl.
CPC ............ *G01N 29/44* (2013.01); *G01N 29/07* (2013.01); *G01N 29/2481* (2013.01)

(58) Field of Classification Search
CPC .... G01N 29/44; G01N 29/07; G01N 29/2481; G01N 29/043
See application file for complete search history.

(56) References Cited

U.S. PATENT DOCUMENTS

| | | | |
|---|---|---|---|
| 6,213,944 B1* | 4/2001 | Miller | G01S 15/8993 600/437 |
| 2004/0254439 A1* | 12/2004 | Fowkes | G01S 7/5205 600/407 |
| 2005/0278088 A1* | 12/2005 | Thorner | B60Q 9/005 701/28 |
| 2008/0169132 A1* | 7/2008 | Ding | G06F 3/04162 178/19.02 |

(Continued)

*Primary Examiner* — Amine Benlagsir
(74) *Attorney, Agent, or Firm* — Sheets Law PLLC; Kendal M. Sheets

(57) ABSTRACT

A system for testing an entity using ultrasonic signal transmission and reception is disclosed. The system can include a central node comprising a logic digital subsystem with memory that is capable of transmitting and receiving mixed analog and digital signals, at least one remote node that is capable of transmitting and receiving mixed analog and digital signals with the central node through a bus architecture, each remote node comprising a logic digital subsystem and memory, and at least one transmitter ultrasonic transducer operatively connected to the remote node, the transmitter ultrasonic transducer being capable of transmitting and receiving the mixed analog and digital signals. The central node is capable of addressing the ultrasonic transducer using the digital signals over the bus through the remote node and routing an ultrasonic driving signal originating in the central node and propagating through the bus to the addressed ultrasonic transducer.

14 Claims, 14 Drawing Sheets

(56) References Cited

U.S. PATENT DOCUMENTS

| | | | |
|---|---|---|---|
| 2014/0114190 A1* | 4/2014 | Chiang | A61B 8/4405 |
| | | | 600/440 |
| 2014/0121524 A1* | 5/2014 | Chiang | A61B 8/0891 |
| | | | 600/459 |
| 2023/0048233 A1* | 2/2023 | Salter | B60L 53/65 |
| 2023/0050579 A1* | 2/2023 | Makke | G10L 15/20 |
| 2023/0053786 A1* | 2/2023 | Moore | G06N 3/0464 |
| 2023/0055012 A1* | 2/2023 | Wang | G06N 3/08 |
| 2023/0058568 A1* | 2/2023 | Wang | B60W 40/10 |
| 2023/0078320 A1* | 3/2023 | Salter | G01C 21/3833 |
| | | | 701/1 |
| 2023/0301519 A1* | 9/2023 | Sun | A61B 8/12 |

\* cited by examiner

SYSTEM, APPARATUS, AND METHOD FOR ULTRASONIC SIGNAL TRANSMISSION AND RECEPTION USING A MIXED DIGITAL AND ANALOG BUS NETWORK

FIELD OF INVENTION

The disclosure is related to the fields of non-destructive testing and evaluation of man-made structures, materials, and systems. The present disclosure further relates to the technical fields of non-destructive testing and evaluation and associated electronics, sensor and actuation networks, and ultrasonic systems for diagnostics and prognostics. More particularly, the disclosure describes novel ultrasonic multi-drop bus networks architectures and their components, which are used to deliver ultrasonic signals from multiple physically separate locations to a single or multiple physically separate locations propagating through a single entity or multiple physically separate entities under test. The embodiments accomplish this in a way that minimizes the number of conductors used.

BACKGROUND

Ultrasonic signals are used for numerous applications, including failure detection, health and life diagnostics and prognostics of man-made structures, materials, and systems in so-called non-destructive testing and evaluation (NDT/NDE) applications, diagnostics, prognostics, and imaging applications. The applications can include but are not limited to medical applications, communication systems, or more recently for diagnostics, prognostics, and fault detection in electrochemical batteries and energy storage systems. In the case of the batteries and energy storage systems, ultrasound amplitude and time of flight propagating through a battery has been shown to be correlated to its State of Charge (SOC), State of Health (SOH), Remaining Useful Life (RUL). Ultrasound signals and their subsequent analysis can also be useful to detect precursors to catastrophic failures in batteries, such as thermal runaway failures. In all these applications, there is a need to transmit ultrasonic signals from multiple physically separate points located on an entity or entities under test (e.g., batteries, mechanical structure(s), transmitters in an ultrasound communication system) to physically separate receiving ultrasonic transducers also located in or on the surface of the entity under test, contacting, the man-made structure(s) or material(s) that compose the entity under test. In this way, the transmitted ultrasound propagates through the structural or material entity(s) under test, affected by it, and in this way capturing relevant information that can be used for multiple purposes of diagnostics, prognostics, or analysis of the entity or entities. At a point where the ultrasonic receiver transducer is located, the ultrasonic signal is converted to an electrical signal. The electrical signal can be analyzed to draw conclusions about, or measure some aspect of interest of, the entity under test based on the way certain characteristics of the entity(s) affect the way ultrasound propagates through the structural or material entity. FIG. 1 depicts two different known examples or scenarios of such an application.

In FIG. 1, example (a) shows a case where an ultrasound transmission propagates as a surface wave over a structure or material entity, and example (b) shows a case where an ultrasound transmission propagates as a compression wave. In Example (a), there is a single entity 100 under test that is being diagnosed with multiple transmitter and receiver ultrasonic transducers 101 placed in different locations 1-5. In this example, the test may transmit ultrasound waves through the entity 100 at a particular location and receive the ultrasound waves at any other specific location of interest. Some examples of different methods of this are shown in examples (a) and (b) with different types of transducers 101. In example (a) circles represent different transducers 102 that emit and receive a compression wave. In example (b), transducers 102 are shown as blocks connected to entity 100. The arrows between transducers represent the ultrasonic waves propagating between the transmit and receive locations of interest. In example (a), ultrasound waves transmit at location 1 and are received at location 3 or 4. Ultrasound waves may also be transmitted at location 5 and received at locations 2 or 4 or any other location that has a receiver as the few examples shown in example (a) illustrate. In example (b), ultrasound waves propagate as a compression wave. Multiple transmit and receive locations for transducers 102 can send and receive the compression waves through the entity 100, either paired or if the material or structure entity 100 allows, as a reflected compression wave using a single transducer.

In other examples (c) and (d) of FIG. 1, the multiple entities 103 and 104 under test may be considered separate, or independent, from one another. This case may be the consequence of ultrasound not being able to propagate through the space between the entities under test, such as in a case of separate cells in a battery pack. Each is excited independently and the response received also independently from each other. Example (c) shows two cases that use a surface wave to test the entities. In one case a transducer 105 is used as transmitter and another transducer 106 as receiver on entity 103. The lower entity 104 is a case where the same transducer 105 is used as transmitter and receiver in a so-called pulse-echo mode on entity 104. Example (d) shows the case where ultrasound propagates as a compression wave through entity 103 from transducer transmitter 107 to transducer receiver 108. If the entity 104 permits, transducer 107 may send and receive a reflected ultrasonic compress wave, thereby not requiring the receiver 108. The important point of the examples in FIG. 1 is that many ultrasonic applications require the in-situ transmission and reception of ultrasonic signals through entities under test in multiple locations and using numerous ultrasonic transducers, on single or multiple entities separated by a boundary where ultrasonic signals find it difficult to propagate. The practical implementation of these systems require the delivery and reception of electrical signals to and from the ultrasonic transducers (not shown in this FIG. 1).

FIG. 2 illustrates a conventional approach typically used in the non-destructive testing and evaluation technical field with ultrasonic transducers. The typical equipment example is depicted as a benchtop laboratory unit 210, and star topology 212. Other physical forms of equipment having the same topology can be portable or embedded, the main feature being the fact it uses a star topology architecture to excite and receive ultrasonic signals from the constituent ultrasonic transducers. FIG. 1 depicts two examples of a more general case that could be defined by a matrix between transmitter transducers and receiver transducers located in different places, and conventional ultrasonic systems designed for non-destructive evaluation and testing typically use multiple channels of separate transmitter and receiver transducer pairs, or multiple channels to drive and receive back the response. FIG. 2 shows an example of the architecture of a conventional system 210 of a pulser/receiver or arbitrary waveform/receiver with multiple channels Ch1, Ch2, Ch3 . . . Chx, each connected to a single ultrasonic transducer transmitter, receiver, or combined transmitter/receiver. If multiple locations on an entity need to be evaluated or diagnosed with ultrasound in an application, such as the cases in FIG. 1, then such a conventional system 210 will need as many channels as there are locations of interest. If the locations of interest are numerous, such as hundreds, thousands, or more, this represents a problem of scalability, and consequently of cost, reliability, among others. This is because the conventional system 210, and derivatives of it, are based on a star topology architecture 212 where every ultrasonic transducer requires independent wires to connect to the central location, which is in charge of generating the excitation signal for transmitter ultrasonic transducers, and receiving the ultrasonic signal responses, as well as interfacing to a monitoring and control system for further processing of the signals. In the case of FIG. 2, the central location is depicted as a benchtop instrument, but other cases may include portable instruments, or embedded systems, all having a star topology 212.

Within the context of this problem and application, what is needed is a system, apparatus and method that is scalable to numerous locations where ultrasonic transducers are located, and this system must be able to operate with a topology that lends itself to a more flexible and cost-effective field deployment and with as few components and wires as possible.

SUMMARY

The examples and embodiments of the disclosure offers a solution to realize a network of ultrasonic transducers that are physically separated. These embodiments can define an active sensor network, where sensing is performed by actively exciting transmitting ultrasonic transducers and sensing is performed from receiving ultrasonic transducers as well as other sensors. The present embodiments further disclose a mechanism to accomplish the coordinated excitation and reception of electrical signals required by and generated by ultrasonic transducers in an economical and more technically efficient way. In particular, a networked system and method that minimizes the number of electronic components and the number of wires needed to drive and receive from ultrasonic transducers placed in multiple physically-separated locations.

The topology of an exemplary network can be that of a single or multiple buses joining a central node, or a cluster of central nodes, with a multitude of remote nodes. The remote nodes interface to one or more ultrasonic transducers for transmission, reception, or both, and may also provide interfaces to other sensors, including but not limited to temperature, gas, strain, voltage or current sensors. The central node can interrogate the remote nodes via said wired bus, which can have 1-wire plus return, or more wires, in single-ended or differential modes, electrically driven by voltage or current sources. The signaling scheme propagating through one of the buses is a mixed analog and digital signaling scheme used to configure and operate the network and to convey the sensed signals from the remote nodes to the central node. The central node can address the desired remote node to transmit and receive, to transmit, or to receive in the same or different remote nodes, creating the possibility of a flexible ultrasonic transmission and reception network where the links between transmitter and receiver ultrasonic transducers can be controlled as desired by a higher-level controller, manager or user via a suitable user interface.

The central node is also capable of powering the remote nodes over the bus by generating appropriate signals, which can be delivered in times when the bus is not being used for transmission of information or ultrasonic driving signals or sensing. When the bus is being used for transmission of information or ultrasonic driving signals or sensing, each remote node can extract power from an energy storage component previously charged with the power from the central node, such as a capacitor. The mechanism of powering the remote nodes and electrically driving and receiving ultrasonic signals is analog and the configuration of the network or addressing of the different remote nodes is accomplished with digital signaling. This implies the present invention utilizes a mixed digital and analog signaling mechanism over the same bus to enable ultrasonic applications using multiple ultrasonic transducers deployed over the wired bus. Several embodiments are presented, including 1-wire, 2-wire and 3-wire configurations, as well as multi-bus configurations.

BRIEF DESCRIPTION OF THE DRAWINGS

The present embodiments are better understood by reference to the following detailed description when considered in connection with the accompanying drawing, wherein.

DETAILED DESCRIPTION

Figure 1:
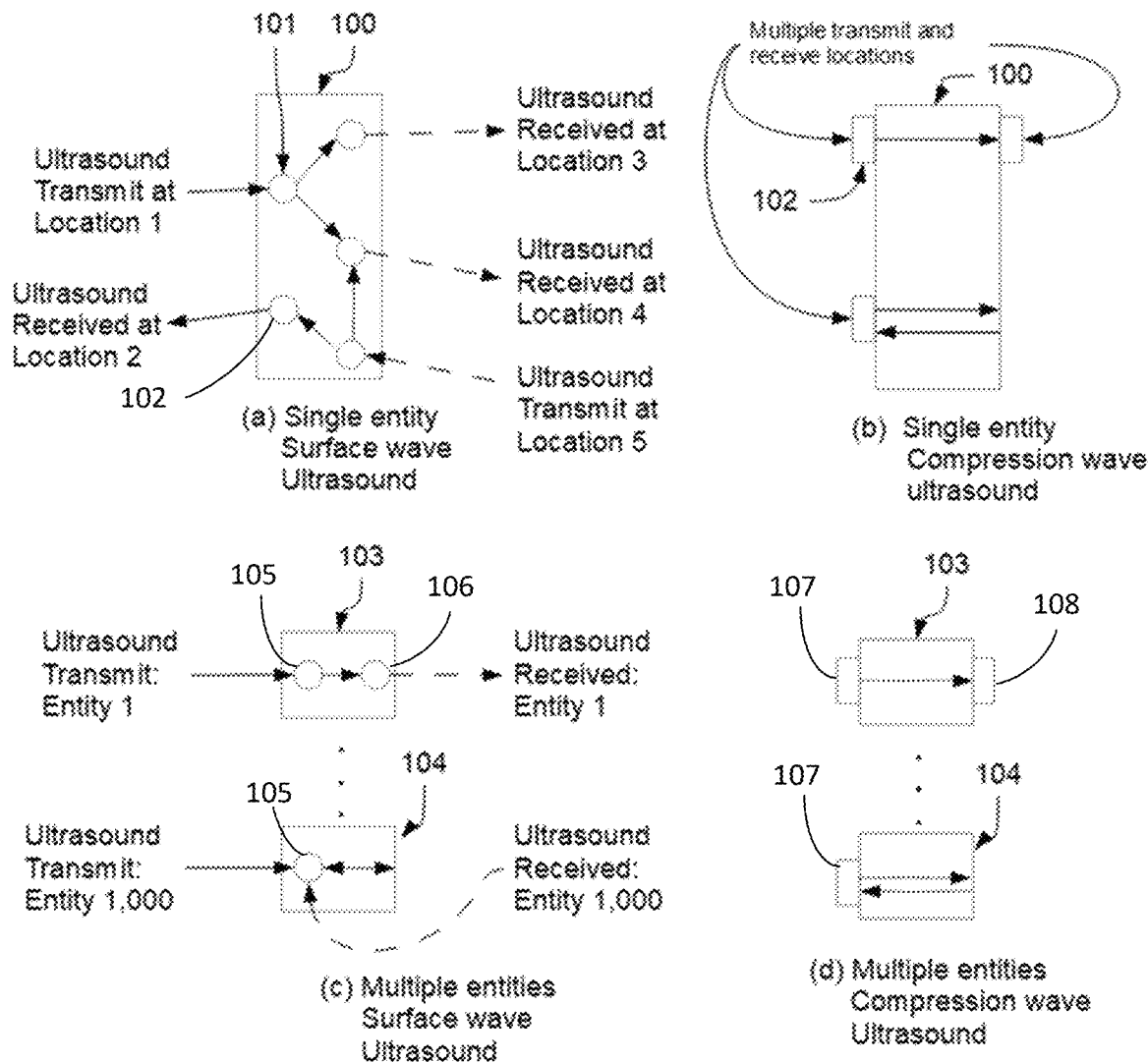
FIG. 1 illustrates a conventional multi-transmit and receive ultrasonic system for non-destructive evaluation, diagnostics, prognostics applications.
Figure 2:
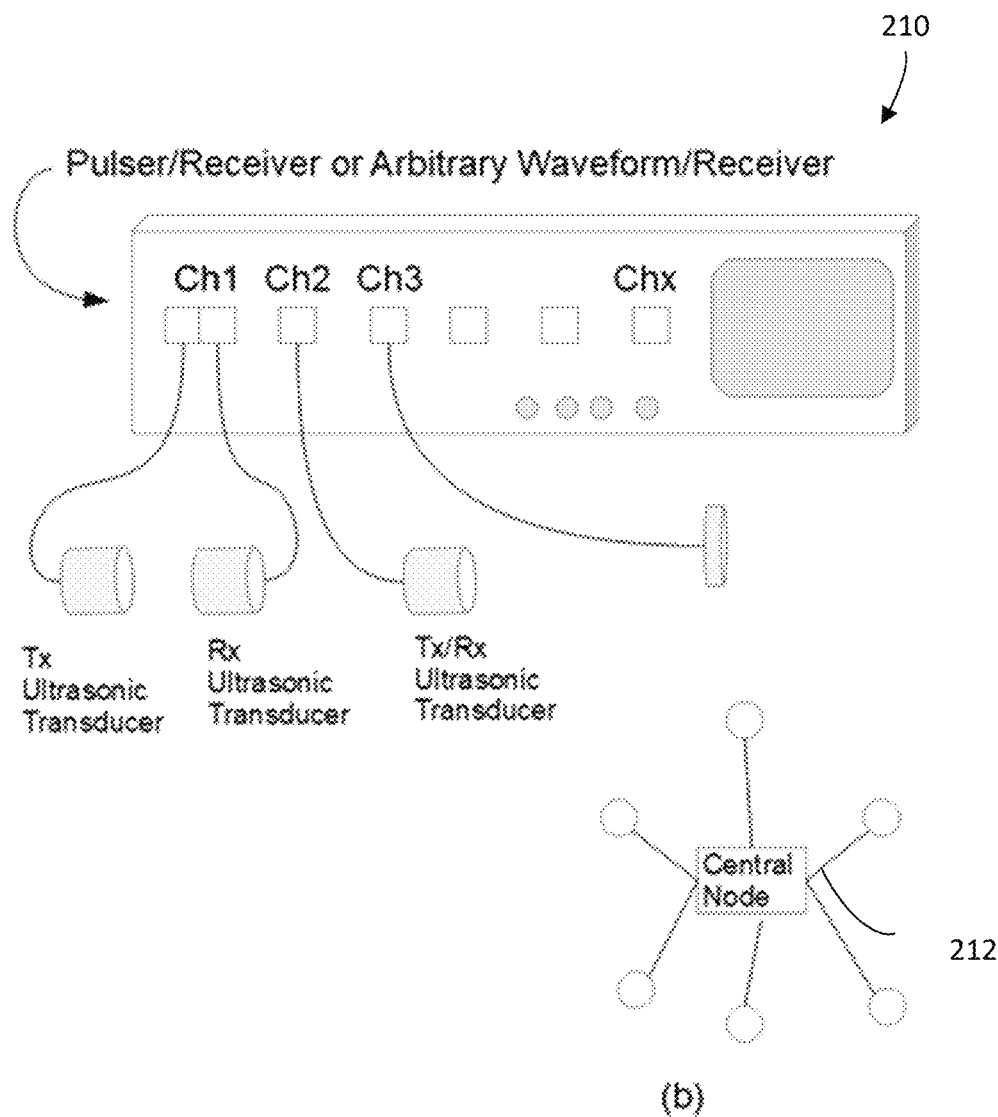
FIG. 2 illustrates a conventional system that is typically used in the non-destructive testing and evaluation technical field with ultrasonic transducers having a star topology.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims. The present disclosure is to be considered as an exemplification of the invention and is not intended to limit the invention to the specific embodiments illustrated by the figures or description herein.

Various embodiments of the present invention may incorporate one or more of these and the other features described herein. The following detailed description taken in conjunction with the accompanying drawings may provide a better understanding of the nature and advantages of the present invention. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications. While the invention has been described with a certain degree of particularity, it is manifest that many changes may be made in detail of construction and the arrangement of components without departing from the spirit and scope of this disclosure. The present disclosure is to be considered as an exemplification of the principles of the invention and is not intended to limit the invention to the specific embodiments illustrated herein by the figures or description above.

The architecture of the present embodiments can solve the problems of the conventional systems, devices, and methods by using a bus topology architecture with exemplary features and devices described herein. In one embodiment, a bus can connect a central node to several remote nodes. The remote nodes can have ultrasonic transducers connected or operatively connected to them. All (central and remote nodes) in this case share the same bus. This bus can be composed of wires, which can distribute the signaling necessary to operate the network of transducers, and can also deliver power to the remote nodes. In other embodiments, some of the digital communications on the bus could occur wirelessly. Every remote node can have one or more ultrasonic transducers in the node or operative connected to perform pulse-echo or pitch-catch mode of ultrasonic interrogation for analysis of an entity or entities under test, such as structures, materials, battery cells, among others. In some embodiments, each remote node can be interrogated by the central node one by one, or multiple at a time in so called unicast or multicast approaches respectively depending on the number of channels in the bus or the number of buses.

Two exemplary applications of this system can include the ultrasonic-based diagnostics or prognostics of several points of a structure, such as but not limited to locations on an aircraft wing or a wind turbine blade, or any entity for testing with attached ultrasonic transducer pairs acting as transmitters and receivers deployed permanently or temporarily on several separated locations of the structure or system under test. An ultrasonic transmitter transducer needs to be excited electrically to generate ultrasonic waves which propagate through the entity's structure and are detected by a receiver transducer in a different location. The received ultrasound for each receiver ultrasonic transducer location is then translated to an electrical signal, possibly filtered, and amplified, and sent back to its associated central node using the bus subject of this invention.

Another exemplary embodiment can include the use of a similar set of transmitter and receiver ultrasonic transducer pairs as in the previous example, but for a battery pack composed of a multitude of cells. In this case, ultrasonic transducer pairs, namely transmit and receive ultrasonic transducers, can be attached to each individual cell or a sub-set of all cells comprising a battery pack for purposes including, but not limited to, diagnostics, prognostics, state estimation, life prediction, fault detection, or testing. In an embodiment, an ultrasonic signal can be transmitted through a battery cell of the battery pack under test. The response of the ultrasound propagating through the cell can be sensed in a receiving ultrasonic transducer, also attached to the cell under test, and then converted into an electrical signal, which again needs to be sent back to a central node, possibly after filtering and amplification. This central node can be in a battery management system or controller, which can coordinate the next cell that needs to be interrogated with ultrasound and the process repeated. This process can be performed one cell at a time, until all cells of the battery pack, or a subset thereof, are interrogated, or multiple cells at a time depending on the number of orthogonal channels available, for instance a number of simultaneous buses linking several central nodes to their remote nodes.

In all these and similar applications, ultrasonic signals can be delivered and read back to/from multiple remote and physically separated locations, such as multiple cells in a battery pack, to a central location. This transmission and reception of ultrasonic signals often needs to be performed in-situ with several ultrasonic transducers deployed on the entity or entities under test. Thus, an economical and flexible way to accomplish this is needed. In the cases of the two examples above, this central location may be a central monitoring unit, or a battery management system in the case of the battery pack example. Whereas, the remote locations are points of interest such as positions of the structure that need to be monitored or cells in a battery pack. The remote locations may be composed of transmitter, receiver or transmitter and receiver pairs of ultrasonic transducers, and they may be numerous, therefore it is of interest to reduce the cost and power consumption of the system by using the minimum number and simplest of electronic components in the remote and possibly disperse locations, as well as providing a communication mechanism that is reliable, cost-effective, and safe.

In many applications, several transmit ultrasonic transducers need to be excited with relatively large voltages in the tens of volts and higher and/or relatively high frequencies at or above 20 kHz. Generating these excitation signals in every location or remote node where there is a transmit ultrasonic transducer may be impractical or undesirable for reasons that may include size, cost, reliability, and safety, among others. The present embodiments therefore also provide a solution to the problems of the prior systems, devices, and methods by having a central node generate the electrical excitation signal that is broadcasted to the ultrasonic transmit transducers in all remote nodes associated with it or connected to the common bus linking the central node to a number of remote nodes. Besides the signal needed to actuate the transmit ultrasonic transducers from the central node to the remote nodes, which may be considered as an analog signal hereafter, the central and remote nodes need a signaling scheme to select the transmit and receive transducers that are to be enabled or active. This can be accomplished with digital signals propagating through the bus, and finally the received signal coming from the enabled receive transducer is sent back in analog form back to the central node, also on the same bus. Besides digital and analog signals, the bus defined in the embodiments can also deliver power to the remote nodes, if needed. Thus, the embodiments can provide a mixed analog and digital communication system with a bus architecture.

Furthermore, in some embodiments ultrasonic transducers are connected to so-called remote nodes that are as simple as possible from the perspective of the number and complexity of electronic components they use. This is desirable from the cost and reliability perspective because there can be as many remote nodes as testing locations of interest, which as stated previously can be numerous for large applications. This is accomplished by having the central node select each remote node having the transmit ultrasonic transducer and deliver the ultrasonic driving signal for each specific transmit ultrasonic transducer. The remote nodes are only responsible to distribute or route this driving signal under the command and control of the central node to the corresponding transmit ultrasonic transducer connected to the selected remote node. This can be referred to as an asymmetric architecture. In this way, remote nodes are relieved from generating the driving ultrasonic signals, which is usually a costly and logistically difficult process if performed on every remote node in the network.

In an embodiment, remote nodes can be connected to their associated central node via a wired bus. This bus may be composed of a single wire, hereafter referred to as the 1-wire approach, plus a return wire, or more than a single wire. At least three alternative physical embodiments of the bus interconnecting the central node and the remote nodes are possible, namely buses using 1-wire, 2-wires or 3-wires depending on the application and the system under test. The central node can select or address the remote node of interest or next in the queue to be interrogated via ultrasound, drive the excitation signal for the remote transmit transducer, and receive the ultrasonic signal responses using electrical signals. The received signals are then used to perform analysis of the responses or deliver the information to a higher monitoring and control system for further processing and analysis.

The embodiments can include a system, apparatus and method that realizes a scalable and cost-effective bus network of ultrasonic transducers. One embodiment can use a network with a minimum number of wires while being capable of interrogating numerous ultrasonic points of interest with a single channel. This can be accomplished with an asymmetric hardware architecture, and a mixed signal communication scheme integrating digital and analog signals within the same bus. These analog and digital signals can be used to manage the configuration of the network, actuate the transmit transducers, and receive the analog signals from the receiver transducers, all on the same bus, and while having most of the electronic complexity concentrated on a central node, leaving the remote node electronics simple. The subject of the embodiments can solve problems of scalability and cost associated with conventional approaches in applications of non-destructive testing, diagnostics and prognostics using ultrasound, among others.

Other embodiments can include an electronic system that provides a cost-effective architecture and infrastructure to deliver and retrieve the electronic signals needed to drive and receive ultrasonic signals generated and received in physically separated and remote points of interest in a scalable manner. Multiple remote nodes that are physically separated and are the places where ultrasound needs to be delivered can benefit from the system by having the response to those ultrasonic signals retrieved to a central node or to an aggregator node for further analysis, processing and/or visualization. It can be beneficial for some embodiments to monitor many physically separated points of interest one-by-one in any desired scheduling using ultrasonic sensing for any purpose including diagnostics, prognostics or detection of failures related to the system under monitoring or test. The system of the embodiments can also be used to retrieve signals other than those from ultrasound, including but not limited to signals originating from temperature, current, and voltage sensors.

In one embodiment, a system can comprise a central node connected to a set of multiple remote nodes with electrical wires forming a bus network topology. Each remote node can comprise one or more ultrasonic transducers for transmission, reception, or transmission and reception, as well as in alternative embodiments, other sensors, such as temperature and voltage. Each remote node can also be composed of a set of electronic components used for coordination, management, communications, and control in cooperation and under the control of the central node. When only one ultrasonic transducer is present in a remote node, this ultrasonic transducer can be used as transmitter and receiver in the so-called pulse-echo mode, but it can also be used solely as a transmitter or as a receiver when another remote node is involved in the reception or transmission respectively. When more than one ultrasonic transducer is present in the remote node, one or more remote nodes can act as transmitters or receivers in either pulse-echo or pitch-catch modes, or simply as receivers, transmitters, or any combinations thereof. These modes of operation are selected or configured by the central node and realized by each remote node individually.

In other embodiments for an ultrasonic transducer network, the network can include a central node and numerous and physically separated remote nodes. Each remote node having at least one ultrasonic transducer, and possibly other non-ultrasonic sensors, such as those used to measure temperature, voltage, and current. The central node can be responsible for addressing the remote node or nodes with the desired transmitter and receiver pair of ultrasonic transducers, driving the ultrasonic transmitter transducer, and receiving the signals from the receiving ultrasonic transducer, and other sensor signals if present. The electric signal detected by each receiving ultrasonic transducer can be sent to the central node for further processing after possible amplification and filtering. In this network, a user can have the control, manual or automatic, to create a link between any transmit ultrasonic transducer and receiving ultrasonic transducer, each located in the same or different remote nodes on the same entity under test. This can be accomplished in part using a wired bus physical communication system, digital logic, and analog electronics residing in both the central node and the remote nodes.

In one embodiment, a remote node can include one ultrasonic transducer acting as transmitter, and a different remote node with an ultrasonic transducer acting as receiver. The electrical signals to/from the central node to a multitude of remote nodes propagate via a wired bus composed of either one wire plus a reference ground wire, two wires, or three wires depending on the specific embodiment of this invention. This forms a network over which the central node and remote nodes connect and exchange electrical signals that are used to address remote node or nodes that have the transmitter and receiver ultrasonic transducers, drive the ultrasonic transducer used as transmitter, receive the signals from the sensors, including the received ultrasonic signal from the receiver ultrasonic transducer after it has been converted to electrical signal on the remote node, plus possibly other sensor signals. This network can also be used to deliver power to the remote nodes from the central node. The kinds of signals sent and received depend on the exemplary application for the network.

In some embodiments, a system can include a central node and several remote nodes interconnected by a wired bus. The remote nodes can have the ultrasonic transducers, which can be either one, two, or more than two depending on the use of the communication protocols used such as but not limited to pulse-echo mode or pitch-catch mode, respectively, or there can be more transducers depending on the application and protocols. The remote nodes can also have other sensors of interest such as temperature or voltage, etc., that piggy-back on the bus to convey their signal to the central node along with the ultrasonic response. The central node can be responsible for addressing each remote node separately one by one, driving the ultrasonic transducer and receiving the ultrasonic signals and other sensor signals when present. The central node can be, but is not necessarily, connected to another monitoring system, such as a battery management system in the case of a battery monitoring application, or some other monitoring system for further processing of the information conveyed by the system and methods that are the subject of the embodiments.

Other embodiments can include a method to accomplish ultrasonic transmission and reception, along with possibly other sensor data, with either a 1-wire bus, a 2-wire bus, or a 3-wire bus, and using cost-effective, simple remote nodes that can be addressed and interrogated for their sensed information from a central node. The exemplary method can create a controllable network of ultrasonic transducers. The use of a minimum number of wires in a bus configuration and the simplified design of each remote node in terms of number of electronic components reduces the cost of the system when retrieving ultrasonic and other sensed data from the remote nodes; this can also be combined with the increase in installation flexibility and ease of deployment. The embodiments can include the communication architecture, the methods to address each remote node, and the way signals are coordinated to address each remote node and extract their ultrasonic information along with possibly other sensor data.

In some embodiments, remote nodes can be located close to the entity they need to monitor with ultrasound (and possibly other sensors), for example these entities can be cells in a battery pack or specific places in a structure that need to be monitored. The systems, methods, and devices of the embodiments can also be used to select specific transmitted ultrasonic transducers and receivers even when these are located or connected to different remote nodes. For example, in a structure ultrasound can be transmitted in a location A associated with remote node X, and receive at a different location B associated with a received ultrasonic transducer B in remote node Y. One embodiment can include transmitting ultrasound in a location A associated with remote node X, and receive at the receiver ultrasonic transducer in the same remote node X. For example, in a cell, possibly part of a battery pack, the remote node associated with the said cell can have transmit and receive ultrasonic transducers. The transmit ultrasonic transducer is excited and the ultrasound will then propagate through the cell X and be received on the receiver ultrasonic transducer of the same cell X, which is then sent back to the central node for further processing. The architecture of an exemplary ultrasonic transducer network includes the approach to address each individual remote node, and the delivery and retrieval of signals using 1-wire, 2-wires or 3-wires.

In the 1-wire embodiment, the central node can be connected to the remote nodes via a single wire, and the return signal can be, in part, a conductor part of the system being tested, or another system that can serve as a return conductor and that is already present in the system under test or under monitoring and that can replace in part the return wire. For example, if each of the remote nodes is placed on a cell within a battery pack, then a large part of the return connection can be the same as the negative of the battery being sensed or monitored. In this case the power of each remote board can be obtained from the cell it is monitoring or delivered by the single wire being deployed working in conjunction with the return of the battery.

Figure 3:
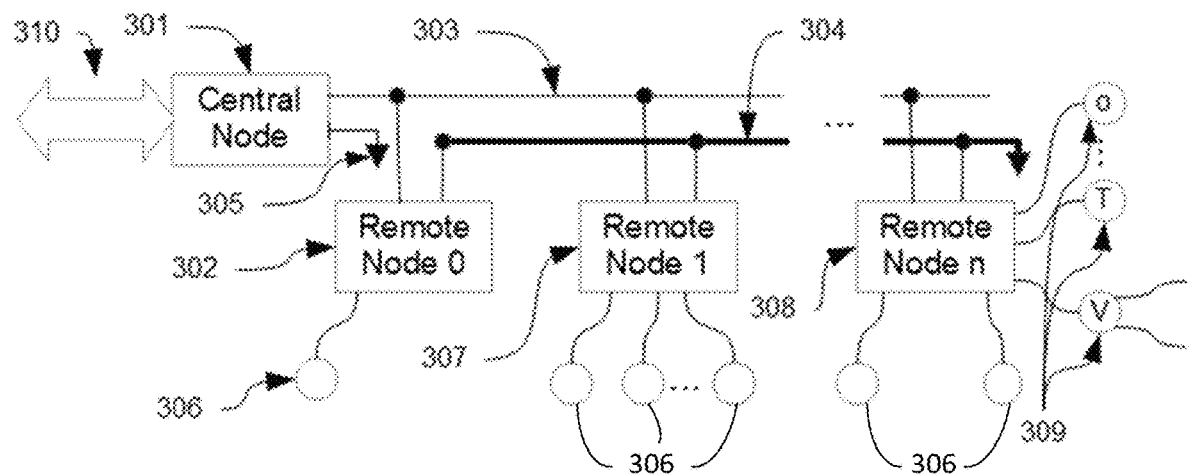
FIG. 3 illustrates a block diagram of the communication architecture of a 1-wire system of the embodiments.

FIG. 3 illustrates a simplified view of a 1-wire system of the embodiments. In FIG. 3, a single wire bus 303 is deployed to all remote nodes 302, 307, 308 and a return 305 is piggy-backed on an existing return conductor 304, such as the return of a battery pack. In the embodiments, remote nodes can have one or more ultrasonic transducers 306, as depicted by remote nodes 307 and 308, that are operatively connected to a remote node. In an exemplary embodiment, remote node 307 can have two more than two ultrasonic transducers 306 operatively connected that can be used as transmitting or receiving transducers, and remote node 308 has two ultrasonic transducers. In other embodiments, the number of ultrasonic transducers connected to remote nodes may vary without departing from the scope of the invention. In other embodiments, remote nodes 302, 307, 308 may also send other sensed signals back to the central node 301 besides that of ultrasonic received transducers, such as data from sensors 309 for voltage (V), temperature (T), and others (O), etc. The central node 301 may drive and receive signals to and from ultrasonic transducers 306 and may receive signals from other sensors 309, if present. The central node 301 may also interface to another system or network via a wired or wireless interface 310.

In some embodiments, a bus architecture can include a wired bus such as bus 303, and a wireless network. Wireless networks configured for the embodiments can include, but are limited to, radio frequency networks such as 802.11, wireless ultrasound, optical, Bluetooth, etc. The analog signals from the central node and the ultrasonic transducers can be distributed and propagated over the wired bus 303, and the digital signals between the central node 301 and the remote node(s) 302, 307, 308 can be distributed and propagated over the wireless network. In other embodiments, the analog signals can be used for ultrasonic transducer excitation and are distributed and propagated over the wired bus, and the received analog ultrasonic signals and the digital signals are distributed and propagated over the wireless network. These exemplary configurations for a bus can apply for 2-wire and 3-wire buses, described below.

Figure 4:
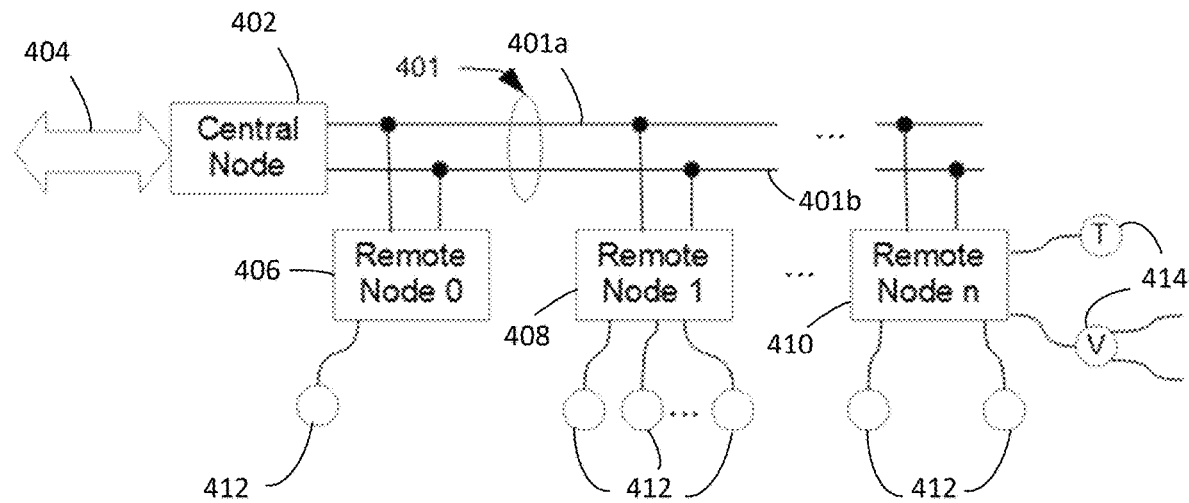
FIG. 4 illustrates a block diagram of the communication architecture of a 2-wire system of the embodiments.

FIG. 4 illustrates a block diagram of the communication architecture of a 2-wire system of the embodiments. The bus 401 is composed of two wires 401a and 401b, with either one acting a return, connecting a central node 402 to one or more remote node (0) 406, remote node (1) 408, and/or remote node (n) 410. The 2-wire embodiment can be useful in cases where the ultrasonic transducers are to be electrically isolated from the entity under test. In the 2-wire embodiment, the network bus 401 can be electrically isolated from the system under test, and the power can be delivered by the two wires along with the rest of the signals from transducers and sensors on remote nodes. The transmit and receive signals, according to a mixed analog and digital signaling scheme, can be sent and received on one of the wires 401a for example with respect to the second wire, 401b, which acts as reference or ground wire. Remote nodes 406, 408, 410 can have one or more ultrasonic transducers 412 operatively connected to the respective remote nodes. In an exemplary embodiment, remote node 408 can have more than two ultrasonic transducers 412 that can be used as transmitting or receiving transducers, and remote node 410 has two ultrasonic transducers. In other embodiments, the number of ultrasonic transducers 412 connected to remote nodes 406, 408, 410 may vary without departing from the scope of the invention. In other embodiments, remote nodes 406, 408, 410 may also send other sensed signals back to the central node 402 besides that of ultrasonic received transducers, such as data from sensors 414 for voltage (V), temperature (T), and others (O), etc. The central node 402 may drive and receive signals to and from ultrasonic transducers 412 and may receive signals from other sensors 414, if present. The central node 402 may also interface to another system or network via a wired or wireless interface 404.

Figure 5:
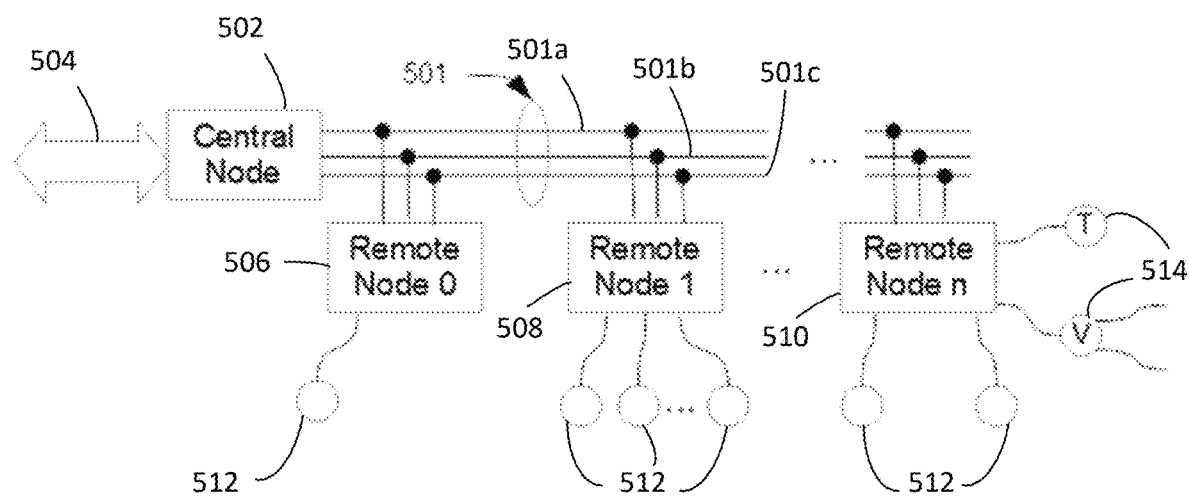
FIG. 5 illustrates a block diagram of the communication architecture of the 3-wire system of the embodiments.

FIG. 5 illustrates a block diagram of the communication architecture of the 3-wire system of the embodiments. The embodiment in FIG. 5 depicts the general architecture of the 3-wire embodiment using three wires as the bus 501 communicating the central node with all the remote nodes. The bus 501 can composed of at least three wires 501a, 501b, and 501c with one acting a return, connecting a central node 502 to one or more remote node (0) 506, remote node (1) 508, and/or remote node (n) 510. The 3-wire embodiment can be useful in cases where the ultrasonic transducers should be electrically isolated from the entity under test. In the 3-wire embodiment, the network bus 501 is electrically isolated from the system under test, and the power is delivered by the three wires along with the rest of the signals from transducers and sensors on remote nodes. The transmit and receive signals, according to a mixed analog and digital signaling scheme, are sent and received on one of the wires in bus 501, for example 501a with respect to the second wire, 501b which can act as a return and 501c can act as reference or ground wire. Remote nodes 506, 508, 510 can have one or more ultrasonic transducers 512 operatively connected by wires or wireless to the remote nodes. In an exemplary embodiment, remote node 508 has more than two ultrasonic transducers 512 that can be used as transmitting or receiving transducers, and remote node 510 has two ultrasonic transducers. In other embodiments, the number of ultrasonic transducers 512 connected to remote nodes 506, 508, 510 may vary without departing from the scope of the invention. In other embodiments, remote nodes 506, 508, 510 may also send other sensed signals back to the central node 502 besides that of ultrasonic received transducers, such as data from sensors 514 for voltage (V), temperature (T), and others, etc. The central node 502 may drive and receive signals to and from ultrasonic transducers 512 and may receive signals from other sensors 514, if present. The central node 502 may also interface to another system or network via a wired or wireless interface 504.

In the 3-wire embodiment, it is possible to implement a system that drives the transmitter and receiver ultrasonic transducers, communicates with the central node and remote nodes, and receives the response of the ultrasonic signal and possibly other sensors back to the central node. In the 3-wire system, the bus 501 can be deployed electrically isolated from the entity under test, be single ended or differential, and a full-duplex communication strategy can be implemented using two of the three bus lines 501a, 501b, 501c, while a third line is used as a ground. Additionally, in an embodiment the system can also be only half-duplex as in the 1-wire case, that is at any given moment in time signals travel in only one direction from the central node 502 to the remote nodes 506, 508, 510, or from the remote nodes 506, 508, 510 to the central node 502.

One advantage the present embodiments is to economically transmit and receive ultrasonic signals at specific locations of interest using a wired bus or multiple wire buses, and alternatively a wireless bus for digital communications. In other words, emitting ultrasound at a given desired location and picking up the response to that emitted ultrasonic signal at a given desired location. The response to the transmitted ultrasound is understood as the response of the system under tests to the ultrasonic signal emitted while propagating through the entity under test. For example, ultrasound may be emitted and propagated through a battery cell or a mechanical structure for diagnostics, prognostics, or fault detection purposes.

Figure 6:
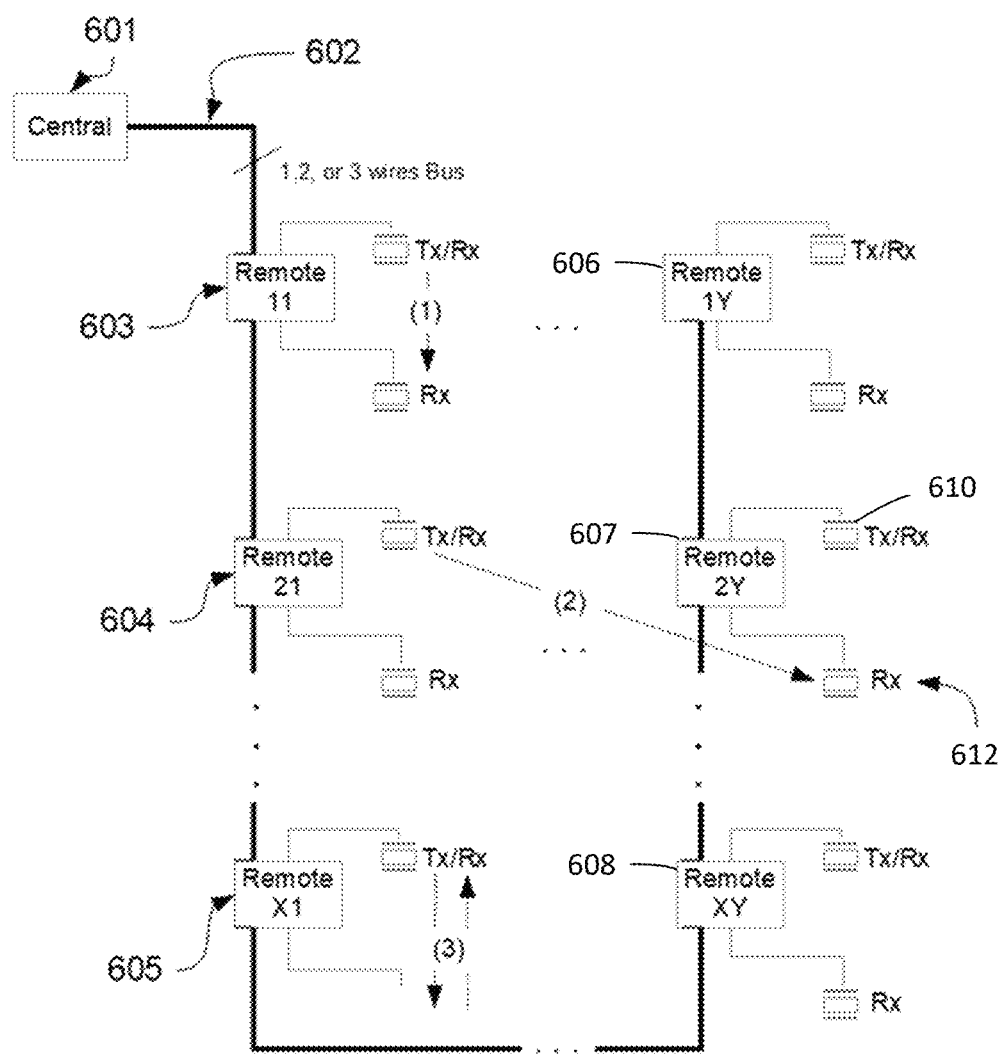
FIG. 6 illustrates architecture of an Ultrasonic Transmitter/Receiver System showing the ultrasonic transducers of the embodiments.

FIG. 6 illustrates architecture of an Ultrasonic Transmitter/Receiver System showing the ultrasonic transducers of the embodiments. The exemplary system can include a central node 601, a bus 602 with one, two, or three wires, that connect remote nodes 603-608 to the central node 601. Each remote node can have one or more transducers, including but not limited to, transmitter/receiver transducer 610 and/or receiver transducer 612 on each remote node. The skilled artisan will recognize that the type, number, and configuration of transducers in the embodiment are exemplary and can vary according to different entities undergoing testing or needs of the tester. The remote nodes 603-608 can be distributed in space, and all are connected to the central node 601 in a bus topology 602. In the example, each remote node 603-608 can have either one or two ultrasonic transducers 610, 612 connected to them. One transducer 610 can be used as transmitter-only in pitch-catch mode, or as transmitter and receiver in pulse-echo mode. This transducer 610 is labeled Tx/Rx. Another transducer 612 can be used as a receiver in pitch-catch mode, and this transducer 612 is labeled Rx. When using pulse-echo only, the receiver transducer 612 is not required.

In an embodiment for network shown in FIG. 6, a remote node 603 can transmit ultrasound (with its Tx/Rx transducer 610) acting as transmitter and a transducer 612 acting solely as a receiver of the ultrasonic signals. In an embodiment, an ultrasonic signal can propagate through the entity under test (not shown), such as but not limited to a laminated structure, any material structure, a battery cell, etc., and the response detected and received by a pre-selected receiver transducer. This pre-selected receiver transducer can be on the same remote node 603 of the transmitter transducer 610 and be either the receiver transducer 612, or the Tx/Rx transducer 610 acting as receiver for a pitch-catch mode of measurement represented with arrow (1) in FIG. 6, or a pulse-echo mode of operation respectively represented with arrow (3); or it can be any other remote node transducer in the network different to the one that transmitted the ultrasonic signal, such as the ultrasonic signal from remote node 604 Tx/Rx transducer 610 to receiver transducer 612 on remote node 607, represented with arrow (2). The central node 601 is the only node in the example that can generate an excitation or driving signal for a previously selected transmitter ultrasonic transducer located in a selected remote node. This signal can travel through the bus 602 until it reaches the chosen ultrasonic transducer. In this way, the generation of ultrasonic driving signals is performed in a single location (the central node 601), which is more scalable and cost effective.

It is noted that in some embodiments, when the application does not require the flexibility to receive the driving signal in a different remote node to the remote node that transmitted, a simplified version of the system is possible whereby only transmitter and receiver transducers are addressed in the same remote node. Such a case is important when the entity under testing is closely associated with a remote node and each remote node is associated with an entity that is considered separate from the perspective of the ultrasonic signals due to large attenuations. An example is a battery cell that is being monitored by a single remote node having either one or two ultrasonic transducers. In that case, the tester would be interested in transmitting and receiving on the same single remote node to sense the battery cell under test that is associated to that remote node, following the example given by arrow (1) for remote node 603 and arrow (3) for remote node 604 in FIG. 6. In such a case, it is not required to transmit on one remote node transducer and a first battery cell and to receive in another remote node transducer on a second battery cell (for example the case represented by arrow (2) that is transmitting from a Tx/Rx transducer 610 from remote node 604 to a receiver transducer 612 on remote node 607) because of the high attenuation offered by the media between the two separate cells. In the embodiments, the electrical signal that drives the selected transmitter ultrasonic transducer or transducers can be generated in the central node 602 that is in a single location in the bus 602. The bus 602 can transmit this signal that can be routed to the previously selected transmit ultrasonic transducer, which is located connected to a remote node.

In an alternative embodiment, a remote node may be configured to assume part or all of the tasks of a central node. For example, a remote node may be implemented in specific applications that can send a driving signal to a transducer, and the return signal received by a transducer on the same remote node or a different node, which would still be transmitted on a bus to a central node.

Figure 7:
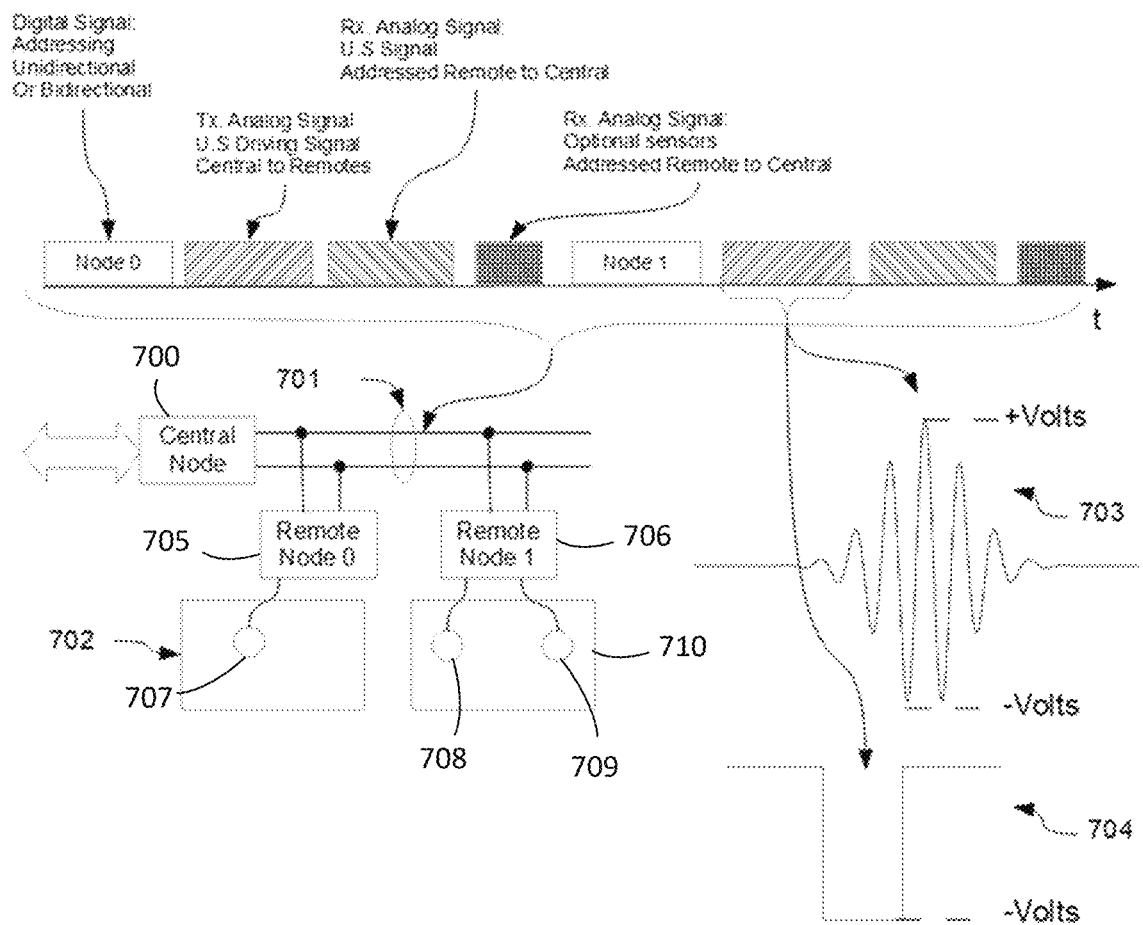
FIG. 7 illustrates an exemplary signaling scheme on the bus of an exemplary embodiment.
Figure 8:
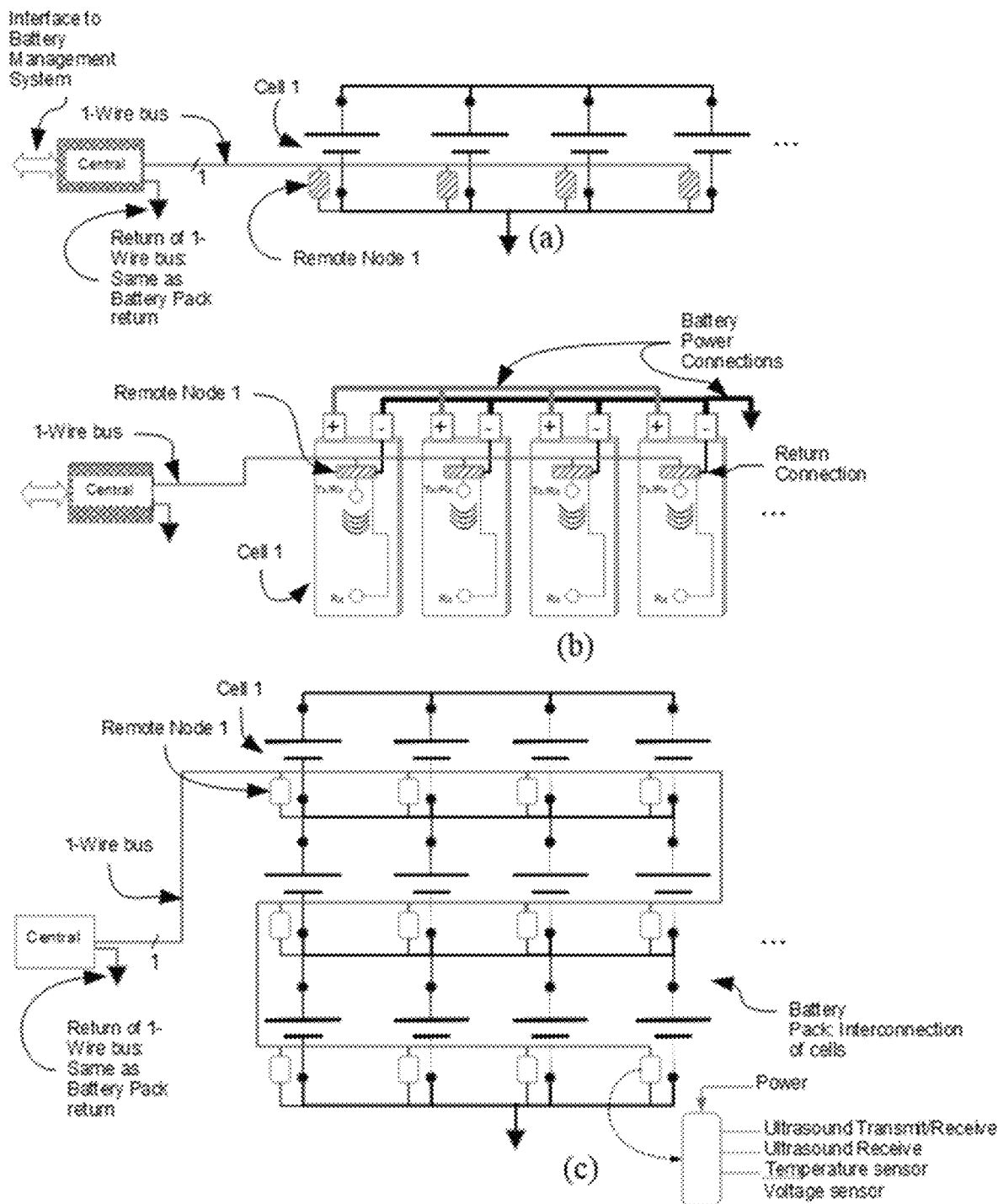
FIG. 8 illustrates an exemplary embodiment in schematic (a) and physical (b) representation of the 1-wire system deployed on a group of batteries or cells connected in parallel and in a larger battery pack with multiple cells connected in series and parallel (c)

FIG. 7 illustrates an exemplary signaling scheme on the bus of an exemplary embodiment, and FIG. 8 illustrates an exemplary embodiment in schematic (a) and physical (b) representation of the 1-wire system deployed on a group of batteries or cells connected in parallel and in a larger battery pack with multiple cells connected in series and parallel (c). The system, methods, and device of the embodiments can be used to pre-select or address the appropriate transmitter and receiver located on a remote node or nodes, to deliver the electric signal generated at the central node that will drive the Tx/Rx transducer acting as transmitter, and to collect the electrical signal from the pre-selected receiver transducer back to the central node. To accomplish this over the same bus, the signals can be multiplexed in time, frequency, or code to make them orthogonal to one another and avoid mutual interference, as in a Time Division Multiplexing (TDM), Frequency Division Multiplexing (FDM), or Code Division Multiplexing (CDM) approach. These methods of signal multiplexing are merely exemplary, and other methods of signal transmissions and/or multiplexing are possible to accomplish the signal transmission and receptions of the embodiments.

FIG. 7 depicts an exemplary signaling scheme used in an exemplary embodiment. The system and methods of the embodiments can be used to pre-select or address the appropriate transmitter and receiver transducers located on a remote node or nodes, to deliver the electric signal generated at the central node that will drive the Tx/Rx transducer acting as transmitter, and to collect the electrical signal from the pre-selected receiver transducer (or Tx/Rx transducer) back to the central node. To accomplish this over the same bus, the signals can be multiplexed in time, frequency, or code to make them orthogonal to one another and avoid mutual interference, such as but not limited to using a Time Division Multiplexing (TDM), Frequency Division Multiplexing (FDM), or Code Division Multiplexing (CDM) approach. The skilled artisan will recognize that these multiplexing methods are exemplary, and any method may be implemented to multiplex signals along the bus in order to avoid mutual interference.

In this embodiment, two remote nodes are shown in FIG. 7, remote node (0) 705 and remote node (1) 706. Both remote nodes can be connected via a 2-wire bus 701 to a central node 700. Remote node (0) 705 can have a single ultrasonic transducer 707 and remote node (1) 706 can have two ultrasonic transducers 708, 709. Each ultrasonic transducer 707, 708, 709 can be used to test an entity depicted as a general block 702. The signaling scheme used in this embodiment is shown on the top of FIG. 7. Digital signaling is first used by the central node 700 to address remote node (0) 705. Addressing of this node activates remote node (0) to enable its transducer 707, which is subsequently driven by the central node 700. The central node 700 can send an analog signal along bus 702 to remote node (0) 705. Two possible examples of these signals include analog signal 703 and digital signal 704, which are both measured in voltage. After ultrasound propagates through the entity 702 under test, and the receiver ultrasound transducer 707 picks up the ultrasound that is propagated through the structure entity 702 and converts the ultrasound signal into an equivalent electrical signal, which is sent back to the central node 702 which can be after possible amplification and filtering. Additionally, the remote node (0) 705 may optionally send additional analog sensor information before the process ends. The central node 700, may decide to continue interrogating the next node, such as remote node (1) 706 to test entity 710, and the process repeats.

An advantageous attribute of the embodiments is the asymmetric architecture of the method and system realized by the simplicity of the electronics in the remote nodes and the encapsulation of most of the complexity within the central node. In particular, the generation of the high voltage and high frequency electric signal used to drive the transmitter ultrasonic transducer resides in the central node, such as signals 703 and 704 in FIG. 7. This electric driving signal can be broadcasted on the wired bus to all remote nodes, but only the pre-selected or addressed remote node is enabled to respond to this signal and route it to the appropriate transducer connected to it. The generation of the electric ultrasonic transmitting driving signal at the central node is key feature for the embodiment that allows distribution of an ultrasonic driving signal across multiple remote entity locations of interest without the need of multiple high voltage and high frequency transmitting amplifiers and channels.

Another embodiment of the signal transmission method includes a time division multiplex (TDM) approach. In an embodiment, the 1-wire approach, which is depicted in FIG. 3 can be used as the example. FIG. 8 shows a more detailed schematic (a) and physical (b) representations of the 1-Wire approach using as example the monitoring of cells in a battery pack, which in this case is composed of battery cells connected in parallel. However, other battery cell connection configurations are possible. One exemplary configuration is shown in schematic (c) of FIG. 8 where there are multiple cells connected in series and parallel, which is a common configuration for larger battery packs. Additionally, the entity under test may vary, such as structures or materials that need to be monitored for cracks, delamination, or other structural failures. The 1-Wire bus in this case links a central node to all remote nodes.

Figure 9:
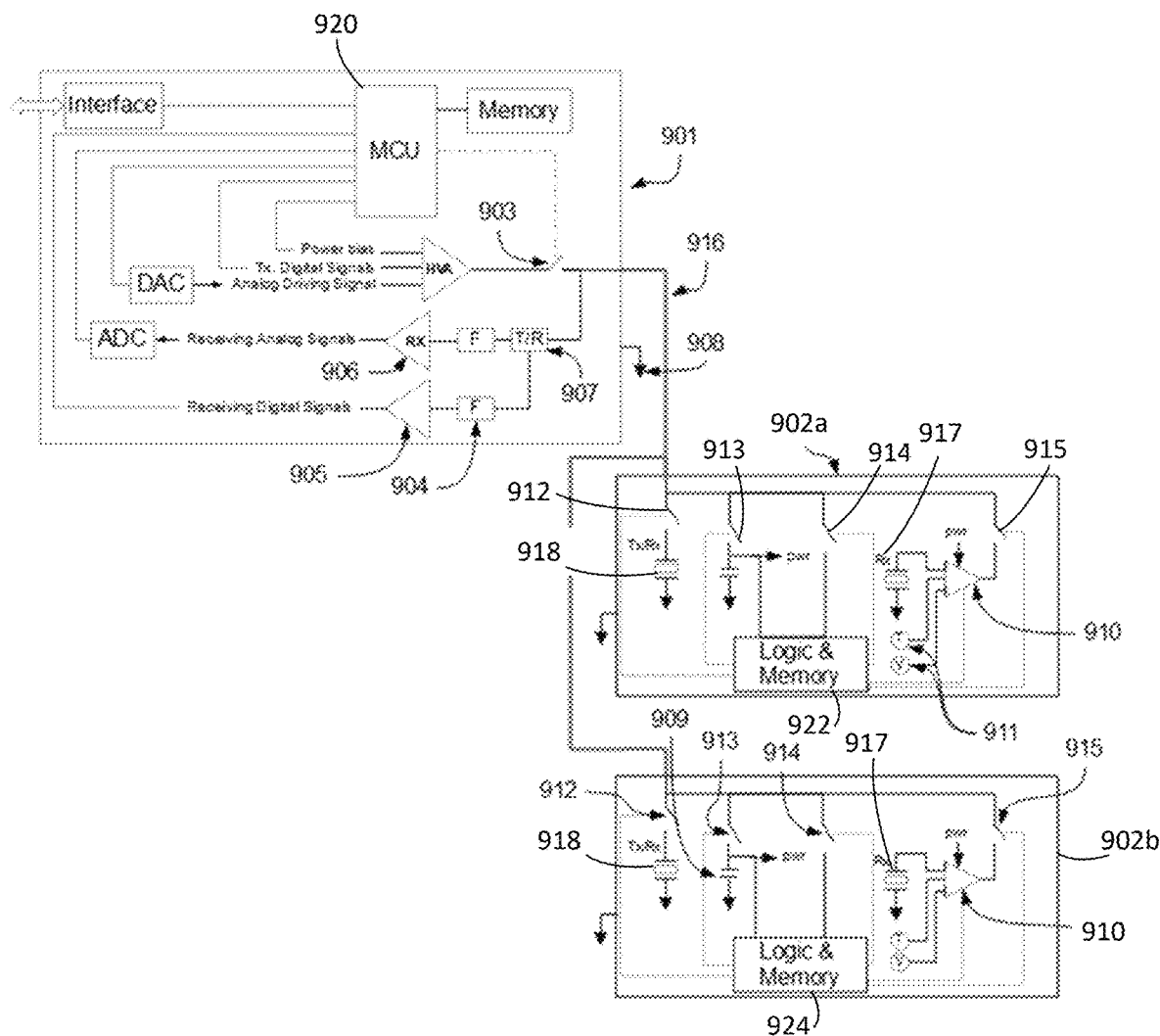
FIG. 9 illustrates an exemplary embodiment of a central node connected with two remote nodes using a 1-wire system and also shows internal sub-systems for both central and remote nodes.

FIG. 9 illustrates an exemplary embodiment of a central node connected with two remote nodes using a 1-wire system and also shows internal sub-systems for both central and remote nodes. In FIG. 9, a more detailed diagram of internal sub-systems of a central and remote nodes is shown for a 1-Wire system embodiment. It is understood that the schematics in FIG. 9 are design and functional levels that illustrate the embodiment, and that in an exemplary implementation other hardware components are needed for proper operation of the system or for a given level of performance, cost and/or other requirements. For example, the use of filters in combination or as complete replacement for the different paths shown in the remote nodes from/to the 1-Wire bus to/from the different internal sub-systems of the remote node could be implemented, which is also applicable to a central node implementation.

FIG. 9 illustrates an exemplary embodiment of a central node connected with two remote nodes using a 1-wire system and also shows internal sub-systems for both central and remote nodes In FIG. 9, an exemplary central node 901 can be connected to remote nodes 902a and 902b through a 1-Wire bus 916. The use of the 1-Wire bus 916 is exemplary, and other embodiments of the design of the sub-systems in FIG. 9 could apply to 2-Wire and 3-Wire embodiments with appropriate design modifications disclosed herein. The bus 916 return can be in a large extent the same wire as the battery pack return depicted by symbol 908. In one embodiment, each remote node 902a, 902b can have three switches 912, 913, and 914, which may be a combination of switch and filter, and the switches 912, 913, and 914 may be implemented, in non-limiting examples with transistors or MOSFET semiconductors. Each remote node 902a, 902b may also include one each of, or alternatively more or less than one each of, ultrasonic Tx/Rx transducer 918 and Rx receiver transducer 917, and possibly other sensors 911 measuring the temperature and voltage of the battery cell under test.

In the embodiments, each exemplary remote node 902a, 902b can include a sub-system denoted Logic & Memory, which can be a digital sub-system that may or may not require software and a processor to operate. Examples of digital hardware with no software requirements can include logic gates, memory and simple field programmable logic devices characterized by low cost, small size, reliability, and low power consumption. Examples of digital hardware requiring software to operate can include micro-controllers/processors/digital signal processors. Remote nodes 902a, 902b can also include an amplifier 910 that can amplify the signals from the receiver ultrasonic transducer Rx 917, and possibly other optional sensors 911. This amplifier 910 may be a summing amplifier or other appropriate amplifier that can function according to the embodiments.

In the embodiments, one of the central node's 901 responsibilities is to remotely drive the Tx/Rx ultrasonic transducers 918 located in the remote nodes 902a, 902b. In one example, the central node 901 can remotely drive Tx/Rx ultrasonic transducers 918 in the remote nodes via a High Voltage Amplifier (HVA) and the 1-Wire bus 916. In this way, a high voltage and high frequency amplification can be performed in a single node (the central node 901), reducing cost and complexity of the more numerous remote nodes. The central node 901 can also receive receiver ultrasonic transducer signals after signals are amplified by amplifier 910 in the selected remote node 902a, 902b and delivered by the 1-Wire bus 916 back to the central node 901. The amplified received ultrasonic signal can be delivered to the Rx amplifier 906 via the Transmit/Receive T/R switch 907 and a filter 904.

The following embodiments include methods for selecting or addressing a given remote node by a central node. In an embodiment, only one remote node can respond back to the central node with the amplified received ultrasonic signal, which is in response to a previously transmitted signal, whether that transmitted signal is on the same remote node or not. If more than one remote node needs to be interrogated, then multiple channels within a bus or alternatively multiple buses can be used.

In the embodiments, the central node 901 and remote nodes 902a, 902b can exchange both analog and digital signals over bus 916. Analog signals can be sensor or actuation related, and can include ultrasound transmit (actuation) and receive (sensor) signals, as well as possibly other sensed signals, such as but not limited to those derived from voltage and temperature sensors. Digital signaling from/to the central node 901 over bus 916 can be used primarily to address a remote node such as remote node 902b, which is going to transmit the ultrasonic signal, and a remote node such as remote node 902a that is going to receive the ultrasonic signal from the first remote node 902b and amplify before transmitting the signal back to the central node 901. The digital signaling can be established between digital subsystems of the nodes, such as but not limited to an MCU/processor 920, or logic unit, in the central node 901 and the logic units 922, 924 run by a processor or other digital system in the remote nodes 902a, 902b. Based on the information sent by the central node 901 processor and/or digital subsystem 920, the remote nodes 902a, 902b can decide what switches: 912, 913, and/or 914 to turn on or leave off and in addition, whether the receiver amplifier 910 must be enabled or not. Furthermore, the central node 901 can provide power to the remote nodes as well via the 1-Wire bus 916 or any other wired bus (i.e., 2-wire, 3-wire, etc.) of the embodiments if desired.

Figure 10:
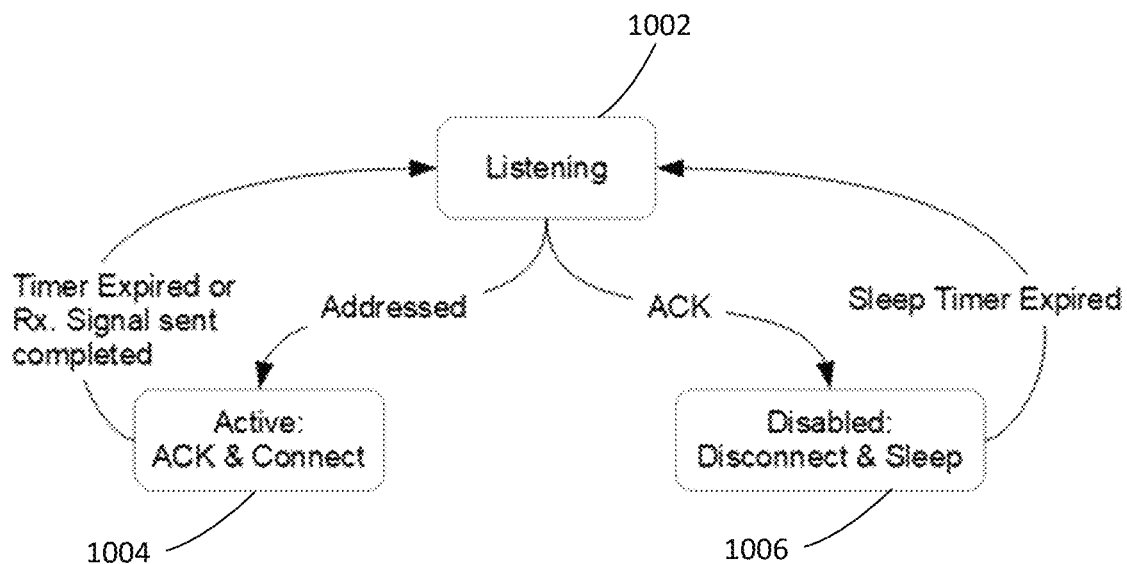
FIG. 10 illustrates a state diagram of a remote node with Tx and Rx transducers on the same remote node of the embodiments.

FIG. 10 illustrates an exemplary state diagram of a remote node with Tx and Rx transducers on the same remote node, such as the case of remote node 902a. In the embodiments, three higher level states may be possible as shown in this diagram: listening 1002, active 1004, or disabled 1006. These states apply regardless of whether a 1-wire, a 2-wire, a 3-wire or 3+ wire bus is used in an exemplary system. In the listening state 1002, a remote node can listen for a signal coming from the central node 901. The remote node 902a can use logic to determine both whether it should be moved to an active state 1004 and acknowledge a transition to a disabled state 1006 that lasts for a predetermined time period. The transition between states for remote node 902a is discussed more fully below.

For the following embodiment for bus signaling, all remote nodes 902a, 902b are initially in a listening state 1002 on the bus 916 for a command or signal coming from the central node 901. In the listening state 1002, switches 913 and 914 can be in the position of "on" in all remote nodes, and switches 912 and 915 can be in the "off" position. Switch 913 can be used to deliver power from the central node 901 to the electronics in the remote node 902a, 902b, whereas switch 914 can be used to allow the exchange of digital data with the central node 901. Both digital signals and power share the same bus 916. In an embodiment, the remote nodes 902a, 902b can use passive filters in combination with the switches, such as a high pass filter for the digital path to accomplish the digital signaling. A power signal can be buffered using a storage element such as capacitor and possibly a voltage regulator.

In the embodiment, when a remote node 902a, 902b is addressed by the central node 901 via a digital command from the central node 901, its state changes to Active 1004. If the remote node 902a, 902b is not addressed, then it remains in the listing state 1002 waiting for an ACK message from a remote node that was addressed previously. The addressed remote node sends an ACK message back to the central node 901 to confirm it is ready for the next step, but prior to this it sets switch 912 on and the rest of the switches 912, 913-915 off to get ready to receive the driving ultrasonic transmitter signal that will come from the central node 901 afterwards. Additionally, at this point the active remote node 902a, 902b may enable the receiver amplifier 910 with a signal at Rx transducer 917, while maintaining switch 915 off. When the ACK message is finally sent, this message is listened to by all remote nodes that were not addressed, which now move to the disabled state 1006. In the disabled state 1006, a remote node turns off all its switches 912-915 thereby disconnecting itself from the bus 916 and going to sleep to conserve power for a pre-defined time. Note that in some embodiments, power can remain in the storage element for sufficient time before a disabled remote node wakes up. The time the remote node 902a, 902b in disabled state 1006 remains sleeping can be precalculated to make sure the node in the active state 1004 finishes its transaction with the central node 901.

After the ACK message is sent by a remote node 902a, 902b, the central node 901 sends an ultrasonic transmitter driving signal. This may be a pulse or an arbitrary waveform of required amplitude and frequency as previously shown in FIG. 7. This signal can excite the transmit ultrasonic transducer 918 in the active, or previously addressed, remote node 902a, 902b. Ultrasound then propagates through the desired structure or entity and reaches the receiver ultrasonic transducer 917. Before ultrasound reaches the receiver ultrasonic transducer 917, switch 915 can be turned on because typically the amount of time the driving signal is on the bus 916 is known in advance and, for instance, a timer can be used. The receiver ultrasonic transducer 917 can detect the ultrasonic signal and can convert it to an electrical signal which is amplified by amplifier 910. This signal is then sent back to the central node 901 for further processing. After this, the receiver node 902a, 902b returns to the listening state 1002. The remote nodes in the disabled state 1006 also return to the listening state 1002 after their timer expires as well and the process starts again under the control of the central node 901, which may decide to address a different remote node in the next round. In this way, the central node 901 can address each of a plurality of remote nodes one by one, possibly in a round robin fashion, send the ultrasonic driving signal and receiving the receiving ultrasonic signal for further processing.

Figure 11:
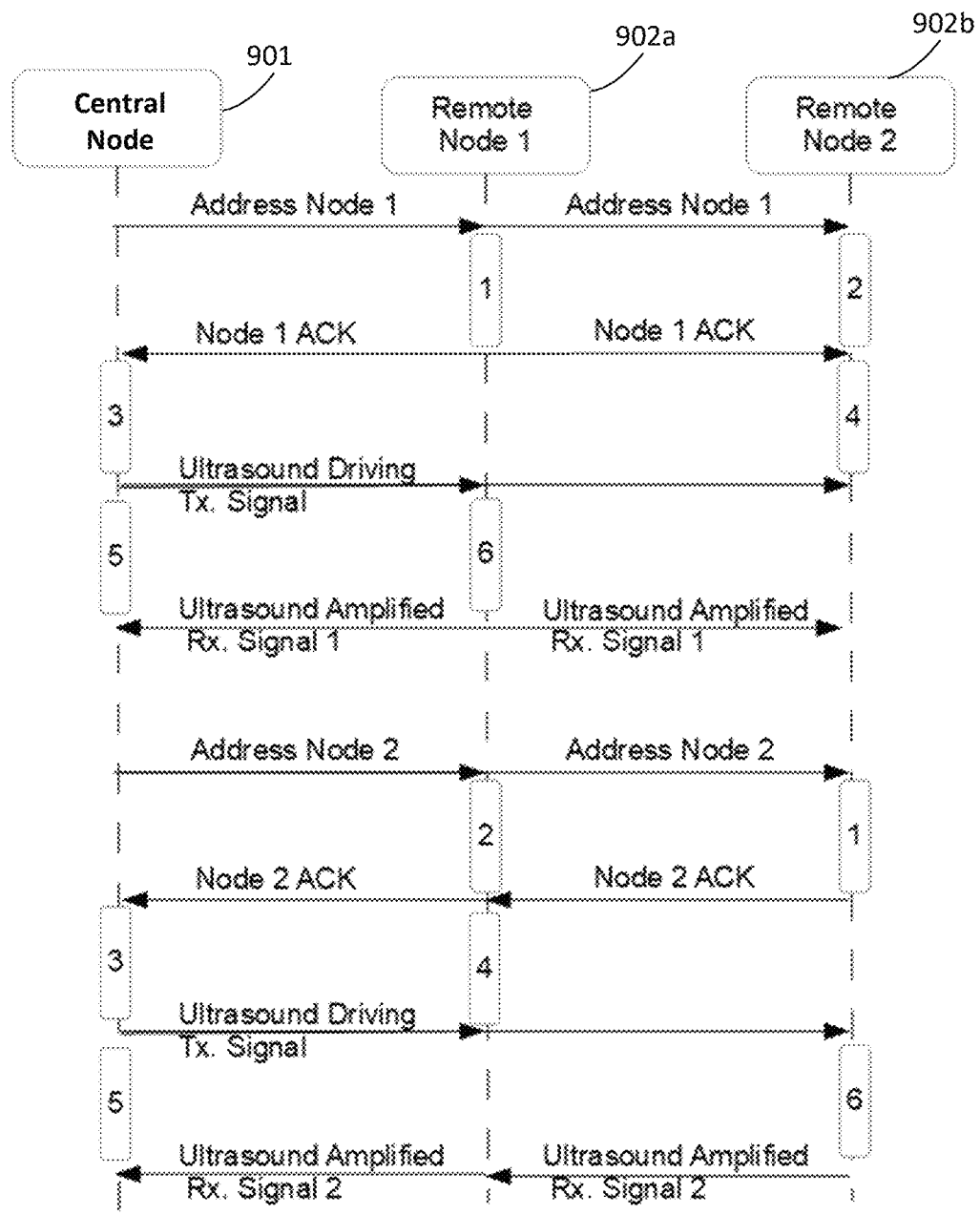
FIG. 11 illustrates a sequence diagram of messages exchanged between the central node and two remote nodes to complement the description of the state diagram shown in FIG. 10.

FIG. 11 illustrates a sequence diagram of an embodiment for messages exchanged between the central node 901 and two remote nodes 902a, 902b, which complements the description of the state diagram shown in FIG. 10. In other words, FIG. 11 depicts a view of the process from the sequence of messages exchanged in an example of a system having central node 901 and two remote nodes 902a, 902b. The example however is not limited to only two remote nodes, and other embodiments could be include a plurality of remote nodes such as, but not limited to, the system in FIG. 6.

In the initial sequence, the central node 901 first addresses the remote node 1 (902a) with a digital message named "Address Node 1" over the bus 916. This message is broadcasted over bus 916 and therefore reaches both remote nodes 1 (902a) and 2 (902b), which take actions as explained previously, including setting up the state of switches or preparing for the next message. This is represented in FIG. 11 by blocks 1 and 2 over the vertical timeline. Next in the sequence, the previously addressed remote node 1 replies to the digital message with a broadcasted ACK (acknowledgement) message, which can be received by the central node 901 and the remote node 2. This ACK message can be used to set switches in, and select a proper logic state in, both the central node 901 and the remote node 2 (902b). This is represented by blocks 3 and 4. Next, the central node 901 broadcasts the electrical signal to drive the ultrasonic transmit transducer 918 in remote node 1, which is received in both remote nodes, but only remote node 1 is set to react to it based on its switch and logic configuration previously set. The block 6 in the timeline of remote node 1 is meant to represent the processing of the received ultrasonic signal on the same remote node 1, which follows up with a transmission of the ultrasound received signal back to the central node 901. Next in the process, the central node 901 may decide to address the remote node 2 as shown in FIG. 11, and the process is repeated. In this way, the present embodiments are capable of driving and receiving signals to and from ultrasonic transducers physically separated over a system that can be used to test an entity with ultrasonic signals.

In addition to the received ultrasonic signal described above, an alternative embodiment can also piggyback signals from other sensors, such as voltage sensors, temperature sensors or others.

Note that the embodiments realize the methods and apparatus for a network of ultrasonic transducers and other sensors. This network combines the use of digital and analog signals transmitted over the same bus. The embodiments can deliver and receive back the electric signals associated with the ultrasonic transducers in analog form and over the wired bus. This can be performed with the intention to minimize the use of digitalization components, such as Analog to Digital and Digital to Analog Converters in the remote nodes, as well as to avoid the need to generate the relatively high voltages often needed when driving ultrasonic transducers. The motivation for this is to minimize the cost, complexity, and size of the remote nodes, and in this way improve the adoption of this technology. This effectively makes the present invention an ultrasonic-centric, low-cost, communication field bus.

Transmitter and Receiver Ultrasonics Transducer on Different Remote Nodes and a 1-Wire Bus One embodiment discloses a process for the case when the transmit ultrasonic transducer is in a different remote node to the receiving ultrasonic transducer. Hereafter, again, the process is described using a 1-wire bus example. The skilled artisan will recognize that the disclosure of a 1-wire bus is exemplary, and similar technologies can expand to embodiments with 2-wires, 3-wire buses, or more as the process to address and transfer signals and information.

Figure 12:
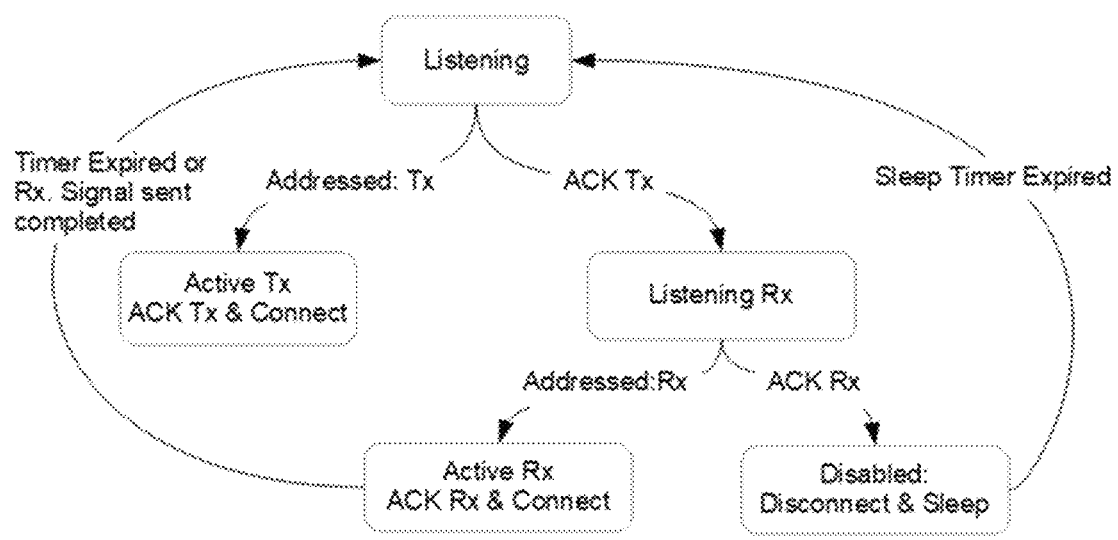
FIG. 12 illustrates a state diagram of the remote node with Tx and Rx transducers on different remote nodes of the embodiments.

In an embodiment, a high-level controller, system or user may decide to transmit ultrasound from a remote node and receive the signal on an ultrasonic transducer located on a different remote node, as in the case shown in FIG. 6 where remote node 604 is used to transmit ultrasound via its Tx/Rx transducer to the receiver ultrasonic transducer 607. Recall that the driving electrical signal can be generated by the central node 601, and this signal is the one that ultimately drives the ultrasonic transducer in remote node 604. In this case, the state diagram can be represented as shown in FIG. 12. The principle is similar to the previous case shown in FIG. 10, except provisions are made to address separately the remote node with the transmit ultrasonic transducer to the one with the receive ultrasonic transducer.

Single-Ended and Differential Embodiments

In most applications and implementations for ultrasonic transducers of the embodiments, there are requirements for electromagnetic interference, or electromagnetic compatibility (EMC). In many cases, this can be addressed with proper cable shielding, twisting cables, and differential, as opposed to single-ended, bus architectures. The present embodiments can also be implemented in differential mode as another possible embodiment. This is possible in the case of using 2 wires or more in the bus. The 1-wire approach is single-ended, and other provisions may be necessary to comply with EMC requirements, such as signal cable shielding or guarding. The skilled artisan will recognize from FIG. 4 and FIG. 5 how a differential wire bus can lend itself to a differential approach. Therefore, single-ended or differential bus architectures are two possible exemplary implementations of the embodiments.

Multi-Bus Configurations

Figure 13:
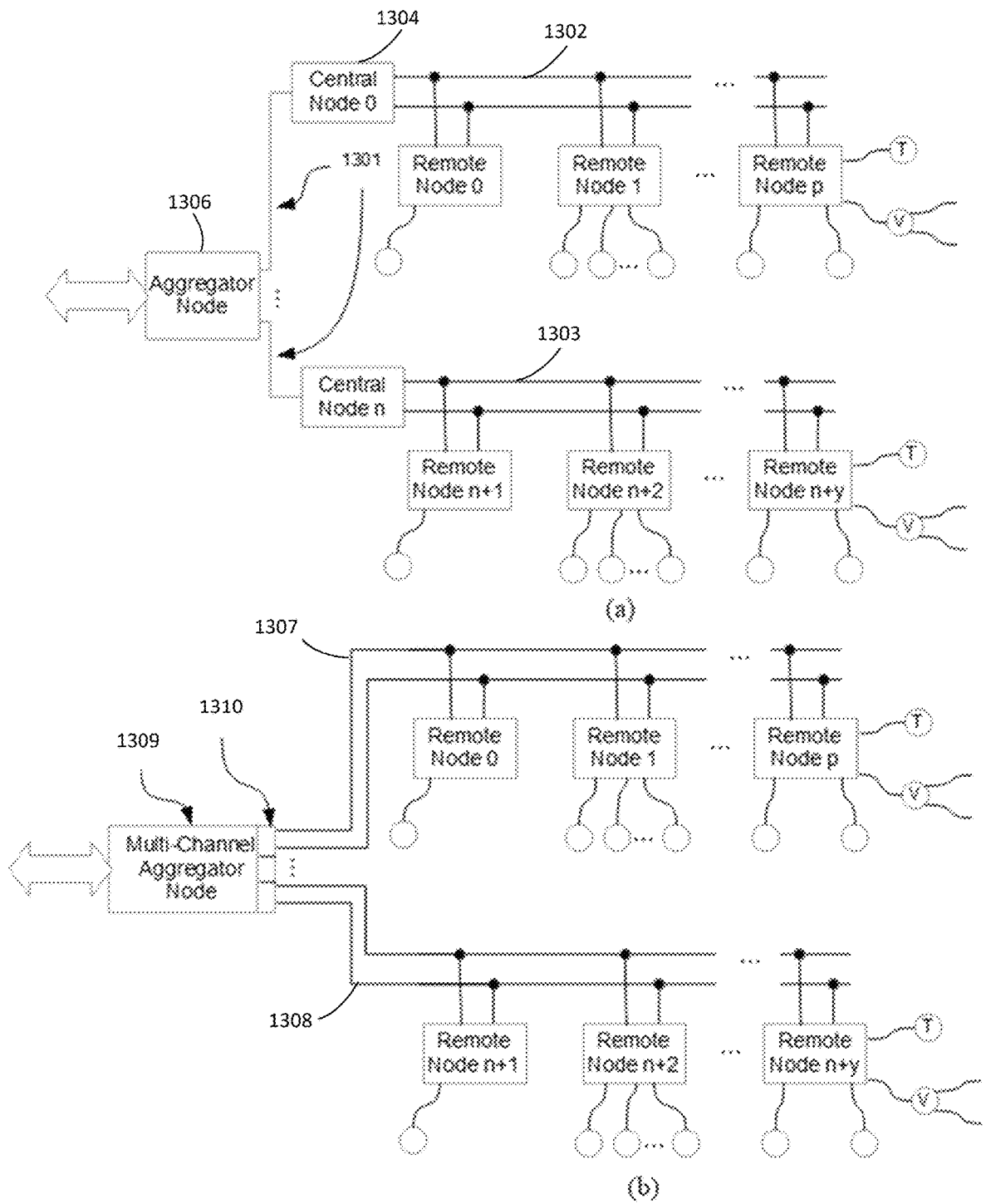
FIG. 13 illustrates a multi-bus configuration of the embodiments.

In an additional embodiment, a network of remote nodes with ultrasonic transducers for testing an entity can have multiple buses controlled by a single central node, or multiple buses controlled by multiple central nodes forming a cluster of master nodes. Multi-bus configurations can be useful to interrogate more than one remote node at a time or to be able to interrogate highly disperse locations. FIG. 13 depicts two possible non-limiting embodiments for a multi-bus using a 2-wire bus, exemplary network (a) and exemplary network (b). In FIG. 13, network (a) can include multiple buses 1302 1303 that are deployed for their respective networks. Each bus 1302, 1303 can have a central node 1304, 1305, respectively, acting as cluster-heads and in turn connected to an aggregator node 1306 via a communication interface 1301, which may be wired or wireless. In this embodiment, the nodes responsible for generating the ultrasonic transmitter driving signals in each separate bus 1302, 1303 can be the cluster head central nodes 1304, 1305, respectively.

An embodiment for network (b) can include multiple buses 1307, 1308 that can connect to a single aggregator node 1309. Instead of a communication interface 1301 in network (a), this example can have the aggregator node 1309 operatively connect to each of the multiple buses 1307, 1308. Aggregator node 1306 can include or can operatively connect to a multi-channel frontend 1310 capable of multiplexing and demultiplexing the signals coming from the different buses 1307, 1308. In this case, there are no central nodes 1304 and the multi-channel aggregator node 1309 can be a de-facto central node that is responsible to generate the ultrasonic driving signals. The skilled artisan will recognize that the systems described in FIG. 13 are flexible, and a combined approach of the embodiments shown in FIG. 13 is also possible as one or more alternative embodiments.

Figure 14:
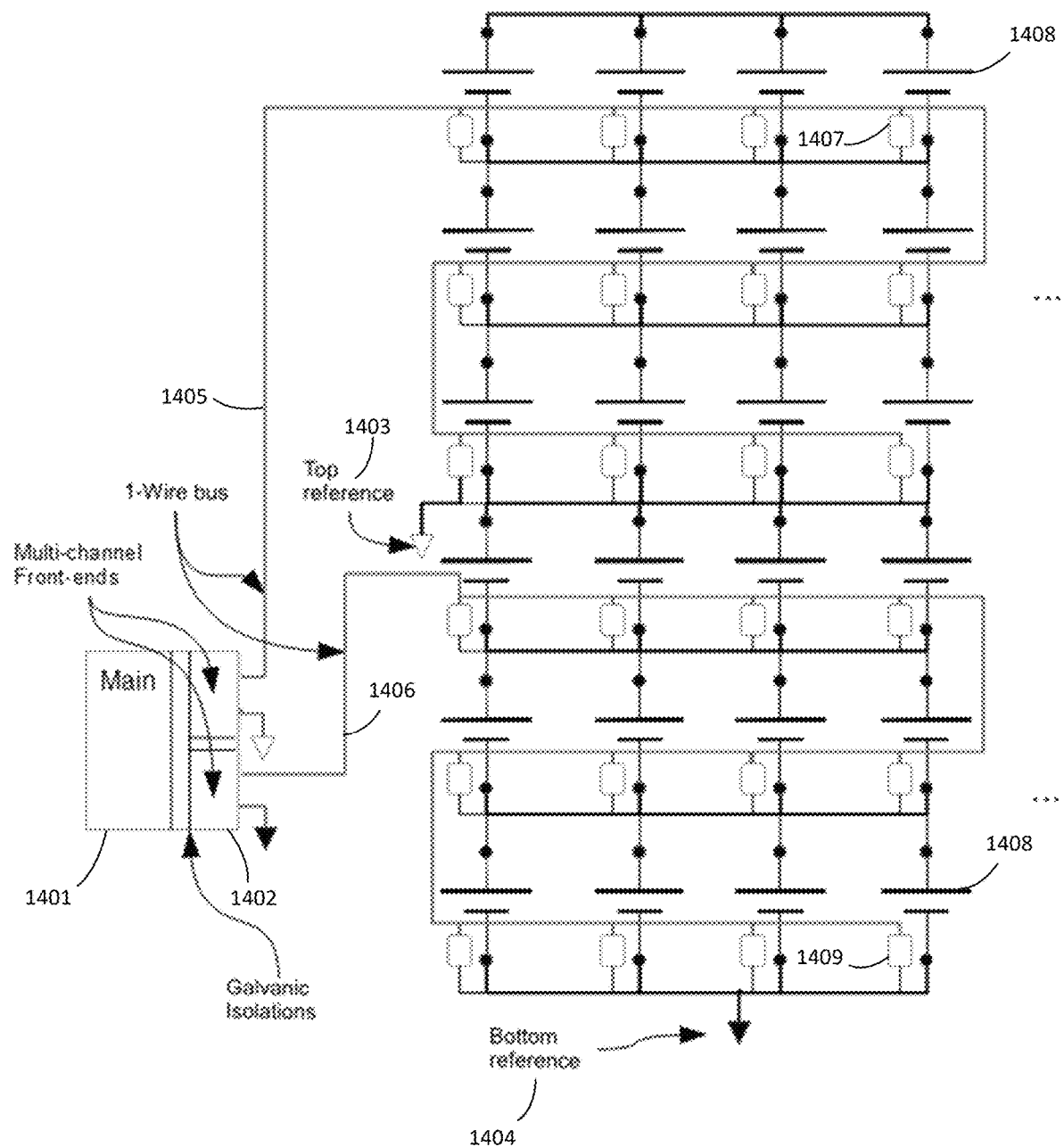
FIG. 14 illustrates a 1-wire embodiment of the invention in a high voltage battery pack.

One example where the embodiments shown in FIG. 13 can be advantageous and useful is in a location where remote nodes are highly dispersed in all directions, and it is deemed more cost effective or practical to deploy several separate buses. Another example where these embodiments can be advantageous and useful is for an ultrasonic evaluation of cells in a high voltage battery pack. An embodiment using multiple buses to analyze and test a high voltage battery pack is shown in FIG. 14. The network in FIG. 14 can include a top reference section 1403 and a bottom reference section 1404. The references in FIG. 14 to "top reference section 1403" and "bottom reference section 1404" are merely exemplary and used to represent portions of a high voltage battery pack that have been divided up into sections for testing to demonstrate the capability of the embodiments. Other embodiments and implementations could divide up a battery pack into any advantageous portions according to the user's preferences such as but not limited to the orientation and number of cells being monitored. The top reference section 1403 can include a first 1-wire bus 1405 that can connect a network of remote nodes 1407 that are dispersed throughout a portion of cells 1408 of a high voltage battery pack. The 1-wire bus 1405 can connect to an aggregate, or main, node 1401 through multi-channel front ends 1402, similar to the networks shown in FIG. 13. The bottom reference network here can also include a second 1-wire bus 1406 that can connect a network of remote nodes 1409 that are dispersed throughout a portion of cells 1408 of the high voltage battery pack. The 1-wire bus 1406 can connect to the aggregate, or main, node 1401 through the multi-channel front ends 1402.

To monitor a large high voltage battery pack like that shown in FIG. 14, it may be necessary to split a bus into multiple buses such as shown in this example because the implementation of the signaling used, both digital and analog, may be simplified as it is maintained at lower voltages. Note that in the example of FIG. 14 two buses 1405, 1406 of a 1-wire bus are used, each with different reference points. In other embodiments, similar architectures can be used with 2-wire buses or more. In the embodiment, the monitoring network splits a bus into multiple isolated buses so as to more easily reach high voltage remote nodes located on higher voltage levels. Such an architecture can be advantageous so that a central node does not have to generate the high voltages needed when reaching remote nodes at the higher voltage points. In that aspect, signaling from/to the central (aggregate) node 1401 can be implemented in split frontends referenced to the corresponding (and separate) reference point 1403, 1404 of each bus 1405,

1406 at a lower voltage level. If the system is not implemented in this design, the single central node 1401 front-end will need to generate high voltages to reach the higher rungs of the bus at the top of, or most distal end of, the battery pack because the single reference of a bus will be the same as the battery return.

The present embodiments can define an asymmetric mixed signal bus architecture for an ultrasonic transducer network. The system, device, and methods of the embodiments can enable the deployment of numerous transmitter and receiver ultrasonic transducers with as few components as possible, and in this way provide a solution to the scalability problem observed in more conventional systems, where each location will require an independent channel. An embodiment for a system for ultrasonic signal transmission and reception can include a network of interconnected nodes that includes one or multiple remote nodes connected via a wired bus. Each remote node can include at least one ultrasonic transducer, used for transmission, reception, or both (of ultrasonic signals), and alternatively also can include a receiver ultrasonic transducer use for reception of ultrasonic signals, and possibly other sensors and associated electronics. The network can include at least one central node capable of powering and/or addressing, transmitting and receiving to and from all or a subset of the remote nodes over the bus. The central node can also send digital signals to select transmitter and receiver ultrasonic transducers in the same or different remote nodes. The bus can comprise single or multiple wire conductors connecting the central node to the multiple remote nodes, where each remote node has at least one ultrasonic transducer in a multi-drop arrangement. A return wire for the bus can be in part or in its entirety an existing system, such as a battery power return or an existing electrically conductive media part of the entity or structure under test.

In operation, the central node can address the transmitter and receiver transducer or transducers of a remote node or remote nodes by any electrical means over the said bus, including but not limited, to voltage or current signals. The central node can generate driving signals for the transmitter ultrasonic transducer(s) which are delivered over the bus after the desired transmitter transducer(s) has(have) been addressed. Each remote node is connected to the bus, which can communicate with the central node. When a remote node's transmitter transducer is addressed by the central node, the central node routes the ultrasonic driving signal originating in the central node and propagating through the bus to the addressed transmit ultrasonic transducer connected to it. The remote node with the addressed transmitter transducer may be different to the remote node with the addressed receiver transducer such that when its receiver transducer is addressed by the central node, a remote node can enable the receiver ultrasonic transducer connected to it and any other electronics associated to the receiver ultrasonic transducer if present. The receiver ultrasonic transducer converts any ultrasonic signal it receives into an electrical signal, which may be filtered and amplified on the remote node and sent back to the central node via the bus. The remote node with addressed receiver transducer can also connect the receiver side associated to the receiver ultrasonic transducer to the bus. In the embodiments, a remote node with the addressed receiver transducer may be different to the remote node with the addressed transmitter transducer.

When not addressed or selected by the central node, a remote node may or may not operationally disconnect from the bus. The remote node may disconnect its receiver ultrasonic transducers on their electrical side or disable and amplifier or buffer used to amplify and/or filter after the ultrasonic signal has been transduced to an electrical signal. The remote node may also disconnect its transmit ultrasonic transducer from the bus, or both its receiver and transmitter ultrasonic transducers from the bus when it is not addressed by its central node.

A remote node can be powered by the central node connected to their shared bus during times when signaling is present or not present. A remote node may also be powered from an energy storage source or any other energy source, such as harvesting energy source based on solar, wind, vibration, thermal energy, or other similar form of power.

A central node may, after reception of signal(s) over a bus from remote nodes' transducers, can process these received signals further, such as but not limited to performing filtering and/or digitalization. The central node may also send the post-processed signal, or the original received signal, to a higher-level system such as but not limited to a controller system, monitoring system, management system, user, or a combination thereof for further processing and/or storage.

An exemplary central node is the device responsible for driving all transmitter ultrasonic transducers in a bus. A bus can transfer, from the central node to a remote node and back, a mixed analog and digital signaling scheme for the purposes of driving and receiving ultrasonic transducer information from multiple locations on an entity/structure. In the embodiments, any transmitter ultrasonic transducer and any receiver ultrasonic transducer associated with any remote node connected to the bus can be addressed over the same bus by the central node. In addition, in some embodiments other sensor signals are received from the remote nodes on the central node or nodes besides the ultrasonic signals from transducers. Examples of such signals include, but are not limited to, electrical signals from temperature, gas, strain, voltage or current sensors. In the embodiments, a central node can transmit an analog signal for purposes of driving actuation devices other than driving ultrasonic transmitter transducers. Transmissions between a central node and remote nodes can use either single-ended or differential transmission and reception over the bus and where signals are driven by either voltage or current sources in both directions, namely central node or nodes to remote nodes and remote node to central node or nodes.

In embodiments using multiple networks, multiple buses are used with one aggregator node having multiple frontends or channel for transmission and reception, or multiple buses with several central nodes as in a cluster network and connected with a backbone interface that may be wired or wireless to an aggregator node, and for purposes of dividing the network of ultrasonic transducers in separate sub-networks.

In the embodiments, a bus can be composed of one wire with return part of the entity under test in part or in its entirety, two wires, or three wires for purposes including, but not limited to, providing isolation, or providing additional channels, or realizing full-duplex communication.

While the invention has been described with a certain degree of particularity, it is manifest that many changes may be made in detail of construction and the arrangement of components without departing from the spirit and scope of this disclosure. The present embodiment is to be considered as an exemplification of the invention and is not intended to limit the invention to the specific embodiments herein illustrated by the figures or description above.

What is claimed is:

1. A system for testing an entity or entities using ultrasonic signal transmission and ultrasonic signal reception, comprising:
a central node comprising a mixed digital and analog electronic system that is transmitting and receiving analog signals and digital signals over a bus;
each remote node of a plurality remote nodes that is transmitting and receiving the analog signals and the digital signals with the central node through a bus network architecture, said each remote node comprising the mixed digital and analog electronic system;
a set of ultrasonic transducers operatively connected to said each remote node, the ultrasonic transducers are transmitting or receiving electric signals to and from said each remote node, wherein a first subset of the set of ultrasonic transducers act as transmitters and a second subset of the set of ultrasonic transducers act as receivers,
wherein the central node is uniquely addressing the set of ultrasonic transducers using the digital signals over the bus network architecture to said each remote node.

2. The system of claim 1, wherein the central node is routing an ultrasonic driving electrical signal originating in the central node and propagating through the bus network architecture to the addressed set of ultrasonic transducers.

3. The system of claim 2, wherein the plurality of remote nodes, operatively connected to the set of the ultrasonic transducers, connected to the central node over the bus network architecture,
wherein the central node can select or address one of the remote nodes of interest or one of the remote nodes next in a queue to be interrogated via ultrasound, drive an excitation signal for the set of ultrasonic transducers, and receive the ultrasonic signal responses from the set of ultrasonic transducers using the electrical signals.

4. The system of claim 1, wherein the central node is formed to power said each remote node by transmitting the electrical signals over the bus network architecture to said each remote node.

5. The system of claim 1, wherein one of the transmitters of the first subset of the set of ultrasonic transducers is configured to receive an ultrasonic driving electrical signal routed from the central node and in turn transmit the ultrasonic driving electrical signal through the entity under the testing, acting in this way as a remote ultrasonic transmitter.

6. The system of claim 1, wherein one of the receivers of the second subset of the set of ultrasonic transducers is configured to receive ultrasonic waves propagating through the entity under the testing, convert the ultrasonic waves to the electrical signals, and transmit the electrical signals to the central node, acting in this way as a remote ultrasonic receiver, or transmitter-receiver.

7. The system of claim 6, wherein said each remote node is configured to receive the electrical signals from said one of the receivers of the second subset of the set of ultrasonic transducers in or on the entity under the testing and transmit the electrical signals to the central node over the bus network architecture.

8. The system of claim 1, wherein one of the receivers of the second subset of the set of ultrasonic transducers is configured to send the analog signals to the central node when addressed.

9. The system of claim 1, further comprising an aggregator node that is formed to transmit and receive the analog signals and the digital signals either from a plurality of central nodes or from the plurality of remote nodes on the bus network architecture without the central node.

10. The system of claim 1, wherein the bus network architecture comprises one or more wired conductors connecting the central node to said each remote node.

11. The system of claim 10, further comprising a return communication channel for the bus network architecture includes a return path on an existing system under testing.

12. The system of claim 1, further comprising a sensor device, operationally connected to said each remote node, wherein the sensor device can transmit data signals to said each remote node, and said each remote node transmits the data signals to the central node.

13. The system of claim 1, wherein the bus network architecture includes a wired bus and a wireless network, and
wherein the analog signals are distributed and propagated over the wired bus and the digital signals are distributed and propagated over the wireless network.

14. The system of claim 1, wherein the bus network architecture includes a wired bus and a wireless network, and
wherein the analog signals are used for ultrasonic transducer excitation and are distributed and propagated over the wired bus, and received as analog ultrasonic signals and the digital signals are distributed and propagated over the wireless network.

* * * * *